(12) United States Patent
Khaira et al.

(10) Patent No.: US 11,826,642 B2
(45) Date of Patent: Nov. 28, 2023

(54) GAME CONTROLLER FOR A MOBILE DEVICE WITH FLAT FLEX CONNECTOR

(71) Applicant: Backbone Labs, Inc., Vancouver, WA (US)

(72) Inventors: Maneet Singh Khaira, Vancouver, WA (US); Atsushi Shirata, Neyagawa (JP); Gregory Robert Cerny, Palo Alto, CA (US); Wei-Jun Wang, Menlo Park, CA (US); Jon Lake, Sunnyvale, CA (US)

(73) Assignee: BACKBONE LABS, INC., Vancouver, WA (US)

( * ) Notice: Subject to any disclaimer, the term of this patent is extended or adjusted under 35 U.S.C. 154(b) by 0 days.

(21) Appl. No.: 17/866,166

(22) Filed: Jul. 15, 2022

(65) Prior Publication Data
US 2022/0347563 A1    Nov. 3, 2022

Related U.S. Application Data

(63) Continuation of application No. 17/504,283, filed on Oct. 18, 2021, which is a continuation-in-part of
(Continued)

(51) Int. Cl.
*A63F 13/23* (2014.01)
*A63F 13/92* (2014.01)
(Continued)

(52) U.S. Cl.
CPC ............ *A63F 13/24* (2014.09); *A63F 13/214* (2014.09); *A63F 13/23* (2014.09); *A63F 13/92* (2014.09); *A63F 2300/1043* (2013.01)

(58) Field of Classification Search
CPC .......... A63F 13/24; A63F 13/92; A63F 13/23; A63F 13/98; A63F 13/20
See application file for complete search history.

(56) References Cited

U.S. PATENT DOCUMENTS 10,868,436 B1    12/2020 Chen et al.
2005/0017953 A1*    1/2005 Pekka .................. G06F 1/1616
345/169
(Continued)

FOREIGN PATENT DOCUMENTS

CN    107008005 A    8/2017
CN    207532765 U    6/2018
(Continued)

OTHER PUBLICATIONS

International Search Report and Written Opinion of the International Searching Authority issued in International Application No. PCT/US2021/019941, date Jun. 9, 2021 (12 pages).

*Primary Examiner* — Peter J Iannuzzi
(74) *Attorney, Agent, or Firm* — MILLER NASH LLP

(57) ABSTRACT

A game controller for a mobile device, the game controller including a first handle, a second handle, a bridge, and a flat, flexible cable. The first handle is configured to contact and support a mobile device. The first handle includes a user-accessible, first hardware interface on a main body portion of the first handle that is configured to accept touch inputs. The second handle is configured to contact and support the mobile device. The second handle includes a user-accessible, second hardware interface on a main body portion of the second handle that is configured to accept touch inputs. The bridge couples the first handle to the second handle. The bridge is in sliding engagement with the first handle and the second handle. The flat, flexible cable is configured to conduct an electrical signal between the first handle and the second handle.

25 Claims, 13 Drawing Sheets

Related U.S. Application Data application No. 16/808,339, filed on Mar. 3, 2020, now Pat. No. 11,389,721.

(51) Int. Cl.
*A63F 13/24* (2014.01)
*A63F 13/214* (2014.01)

(56) References Cited

U.S. PATENT DOCUMENTS

| | | |
|---|---|---|
| 2005/0247550 A1 | 11/2005 | Hamada |
| 2006/0234794 A1 | 10/2006 | Baseflug et al. |
| 2011/0014984 A1 | 1/2011 | Penman et al. |
| 2013/0033829 A1* | 2/2013 | Furubo .................. A63F 13/92 361/752 |
| 2014/0018173 A1 | 1/2014 | Urhman |
| 2014/0274394 A1 | 9/2014 | Willis |
| 2014/0317329 A1* | 10/2014 | Barnett ................ G06F 1/1635 710/304 |
| 2015/0018101 A1 | 1/2015 | Schoenith et al. |
| 2015/0273325 A1* | 10/2015 | Falc ....................... G06F 1/1626 463/37 |
| 2015/0281422 A1 | 10/2015 | Kessler et al. |
| 2016/0132114 A1 | 5/2016 | Rihn |
| 2016/0317919 A1 | 11/2016 | Gassoway et al. |
| 2018/0004250 A1* | 1/2018 | Barnett .................. H01R 24/86 |
| 2018/0133594 A1 | 5/2018 | Guo |
| 2018/0345136 A1 | 12/2018 | Schmitz et al. |
| 2018/0369692 A1 | 12/2018 | Winick |
| 2019/0079584 A1 | 3/2019 | Bonanno et al. |
| 2019/0358534 A1* | 11/2019 | Fang ....................... A63F 13/24 |
| 2019/0379231 A1 | 12/2019 | Gonzalez et al. |
| 2020/0155928 A1 | 5/2020 | Guo |
| 2020/0282309 A1 | 9/2020 | Liao |
| 2020/0353351 A1 | 11/2020 | Mao |
| 2020/0353369 A1 | 11/2020 | Esselstrom et al. |
| 2021/0104907 A1 | 4/2021 | Chen et al. |
| 2021/0275907 A1 | 9/2021 | Khaira et al. |
| 2021/0308566 A1 | 10/2021 | Kong et al. |
| 2022/0032179 A1 | 2/2022 | Khaira et al. |
| 2022/0339533 A1 | 10/2022 | Schoenith et al. |

FOREIGN PATENT DOCUMENTS

| | | |
|---|---|---|
| CN | 207838250 U | 9/2018 |
| CN | 208115138 U | 11/2018 |
| CN | 208636809 U | 3/2019 |
| CN | 209392718 U | 9/2019 |
| EP | 1380324 A1 | 1/2004 |
| EP | 1380324 B1 | 9/2005 |
| GB | 2608588 A | 1/2023 |
| WO | 2023034596 A1 | 3/2023 |

* cited by examiner

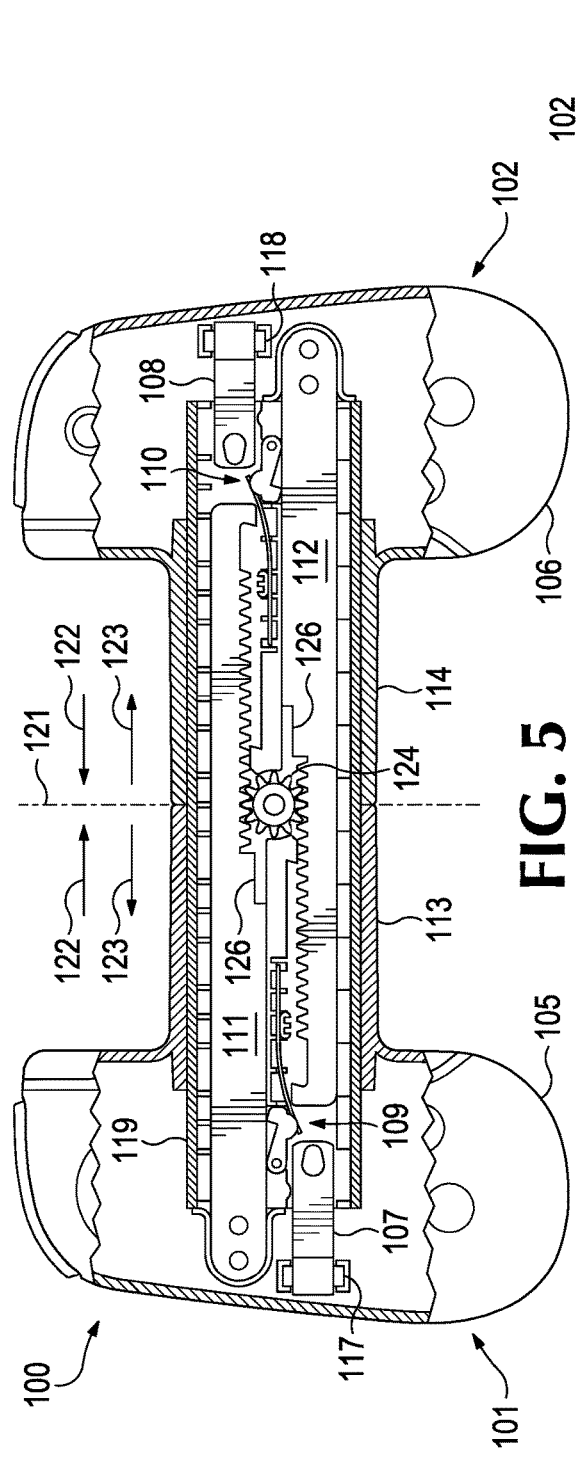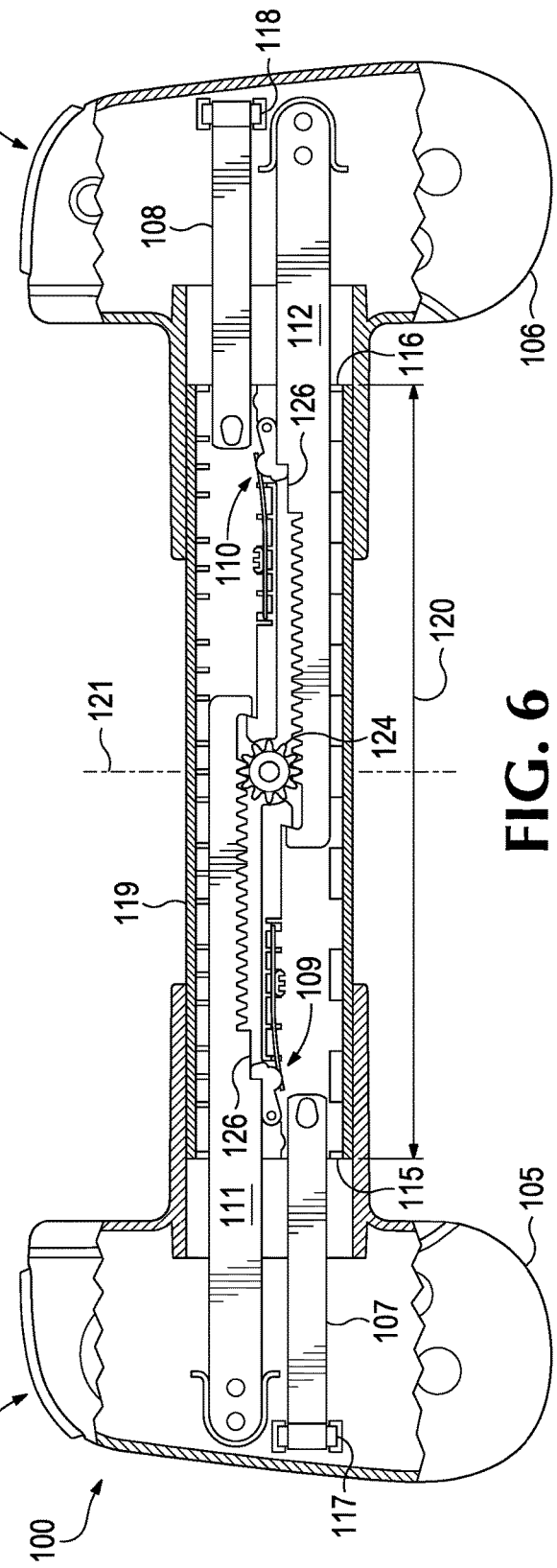

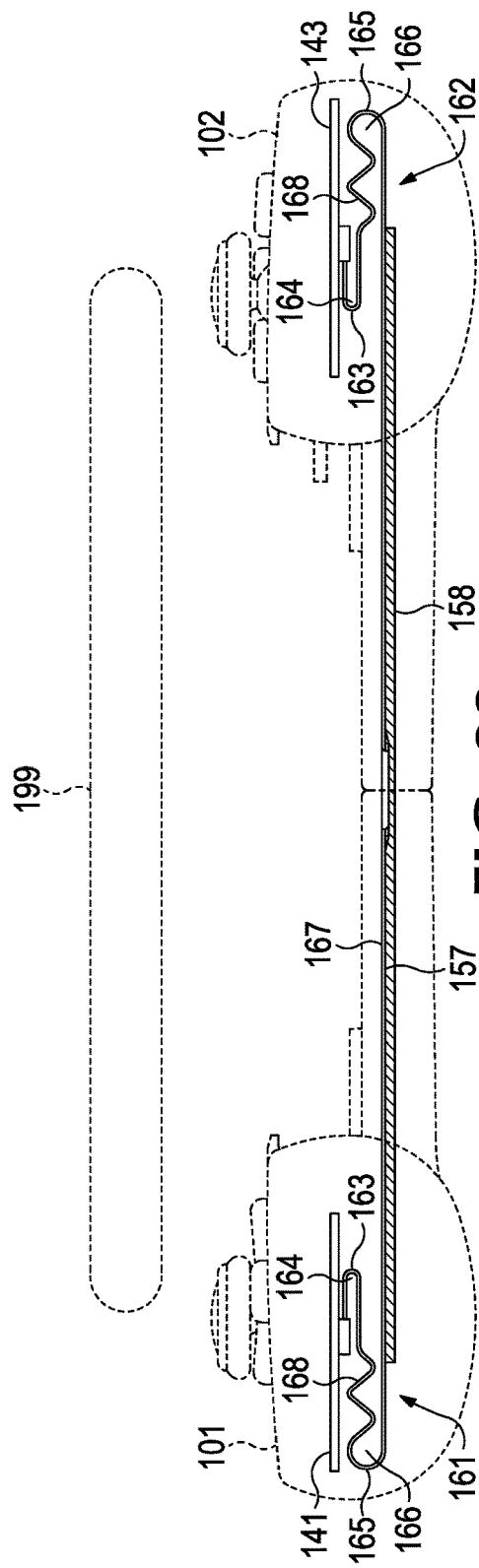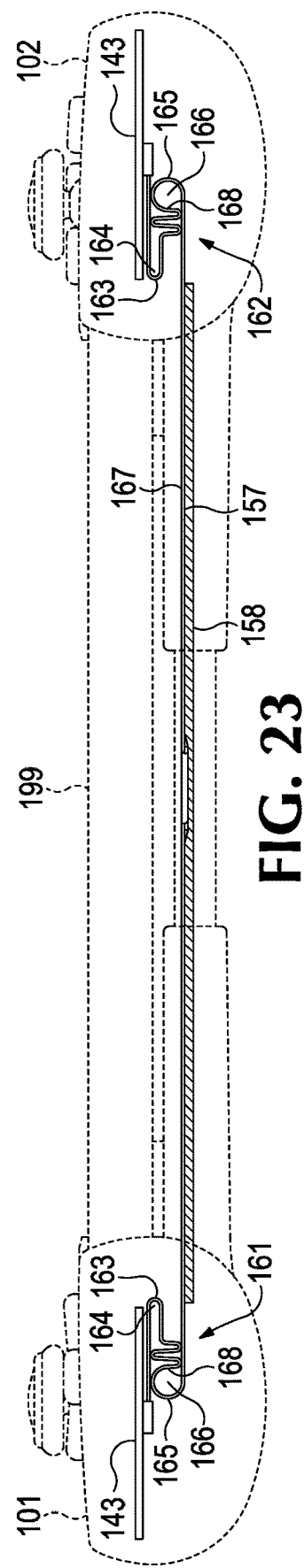

GAME CONTROLLER FOR A MOBILE DEVICE WITH FLAT FLEX CONNECTOR

CROSS REFERENCE TO RELATED APPLICATIONS

This patent application is a continuation application of U.S. patent application Ser. No. 17/504,283, filed Oct. 18, 2021, which is a continuation-in-part application of U.S. patent application Ser. No. 16/808,339, filed Mar. 3, 2020, both of which are incorporated into the present disclosure by this reference.

TECHNICAL FIELD

The subject matter is related to an apparatus and methods for a game controller for a mobile device.

BACKGROUND

A game controller is a device used to provide input to a video game, for example to control an object or character in the video game. The video game may be running on a computer, a specially designed gaming system, or a mobile device. In some prior art devices, the game controller is designed to mechanically couple to a mobile device.

Embodiments of the technology disclosed in this document address shortcomings in the prior art.

BRIEF DESCRIPTION OF THE DRAWINGS

FIG. 5 is a top, partial sectional view of the game controller of FIG. 1 in an example of a retracted configuration of the game controller.

FIG. 6 is a top, partial sectional view of the game controller of FIG. 1 in an example of an extended configuration of the game controller.

FIG. 22 is a front view of the game controller of FIG. 17, in the example of the retracted configuration of the game controller, and showing only certain features internal to the game controller.

FIG. 23 is a front view of the game controller of FIG. 18, in the example of the extended configuration of the game controller, and showing only certain features internal to the game controller.

DETAILED DESCRIPTION

As described in this document, embodiments are directed to a game controller for a mobile device with a hold-open feature.

Keeping the handles pulled apart while inserting the mobile device into a game controller can be difficult. For example, a user holding a mobile device in the user's right hand may need to use the user's left hand to pull the two handles apart when placing the mobile device between the two handles of the game controller. This difficulty with insertion may be exacerbated when the game controller connects to the mobile device via a connector, such as USB-C connector, because the user must also ensure that the mobile device is aligned with the connector when inserting it. The removal of the mobile device may be equally vexing as the user must once again attempt to pull the two handles apart with one hand.

But in embodiments of the disclosed game controller, once the handles are pulled apart sufficiently, the handles lock in place, allowing the user to easily insert the mobile device. Then, by applying light pressure on the handles, the user can unlock the handles and snap the device shut, securing the mobile device to the game controller.

Figure 1:
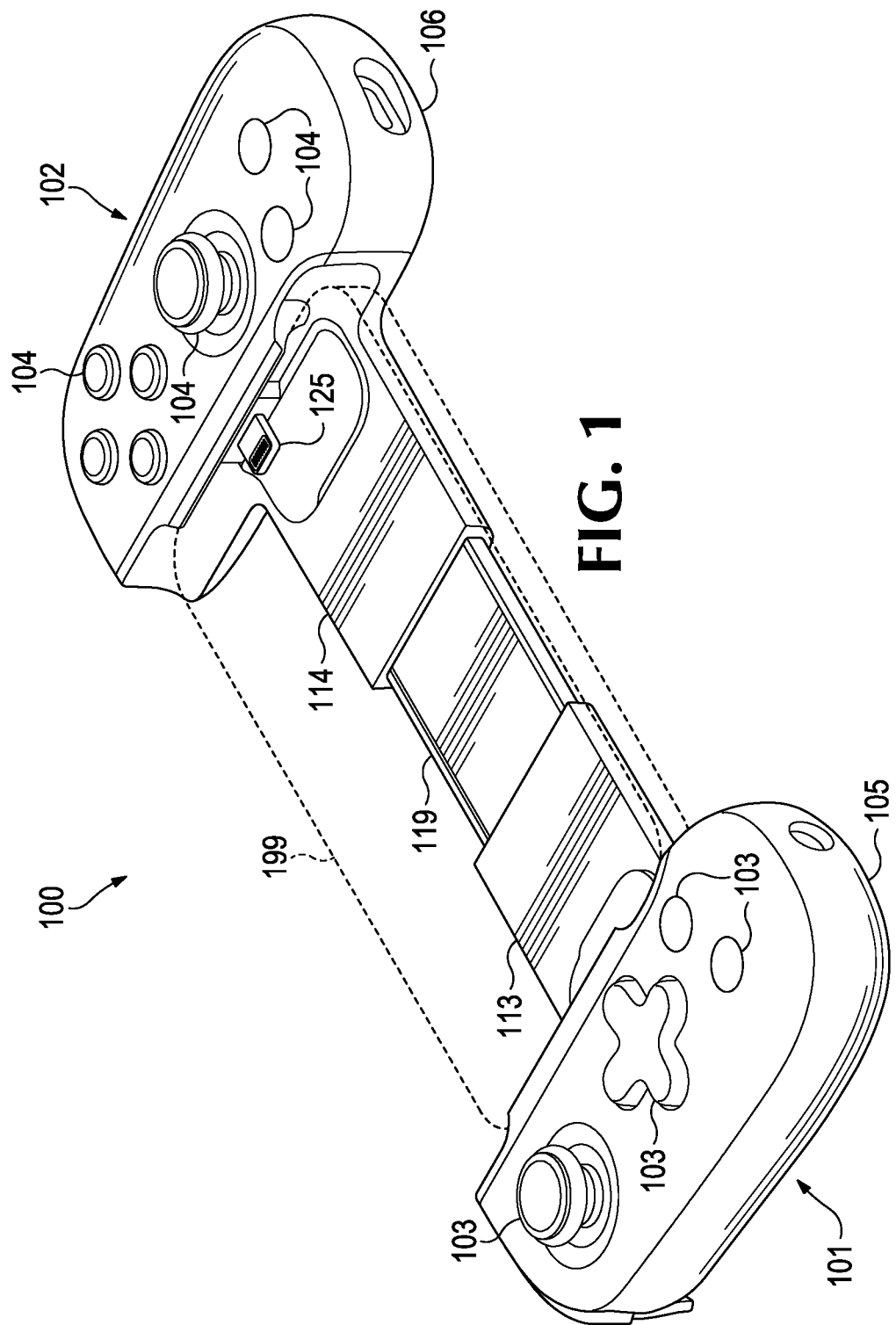
FIG. 1 is a perspective view of a game controller, according to embodiments.

FIG. 1 is a perspective view showing portions of a game controller 100, according to embodiments. As illustrated in FIG. 1, a game controller 100 may include a first handle 101, a second handle 102, and a bridge 119. Each of the first handle 101 and the second handle 102 is configured to contact and support a mobile device 199, though not all contemplated embodiments will include the second handle 102. An exemplary mobile device 199 is shown in broken lines to illustrate how the game controller 100 may contact and support a mobile device 199 in some embodiments. The mobile device 199 may be, as examples, a smartphone or a tablet computer.

As illustrated in FIG. 1, the first handle 101 includes a guide portion 113 and a main body portion 105. The guide portion 113 extends from the main body portion 105 and along a first end 115 of the span 120 of the bridge 119. (See also FIGS. 5 and 6.) The guide portion 113 of the first handle 101 is configured to align the bridge 119 with the main body portion 105 of the first handle 101.

As illustrated, the first handle 101 includes a user-accessible, first hardware interface 103 on the main body portion 105 of the first handle 101. The first hardware interface 103 could be a button, an analog stick, a touchscreen, a touchpad, a knob, a slider, a switch, a wheel, a dial, a directional pad, or another such feature configured to accept touch inputs from a user's finger or a stylus. As shown in FIG. 1, the first hardware interface 103 may include multiple such hardware interfaces.

Likewise, the second handle 102 includes a guide portion 114 and a main body portion 106. The guide portion 114 extends from the main body portion 106 and along a second end 116 of the span 120 of the bridge 119. (See also FIGS. 5 and 6.) The guide portion 114 of the second handle 102 is configured to align the bridge 119 with the main body portion 106 of the second handle 102.

As illustrated, the second handle 102 further includes a user-accessible, second hardware interface 104 on the main body portion 106 of the second handle 102. As above for the first hardware interface 103 of the first handle 101, the second hardware interface 104 could be a button, an analog stick, a touchscreen, a touchpad, a knob, a slider, a switch, a wheel, a dial, a directional pad, or another such feature configured to accept touch inputs from a user's finger or a stylus. The second hardware interface 104 may include multiple such hardware interfaces, as illustrated in FIG. 1.

One or both of the first handle 101 and the second handle 102 may include a connector 125 for physical and electrical connection to the mobile device 199. The connector 125 may be, for example, a USB-C connector.

Figure 2:
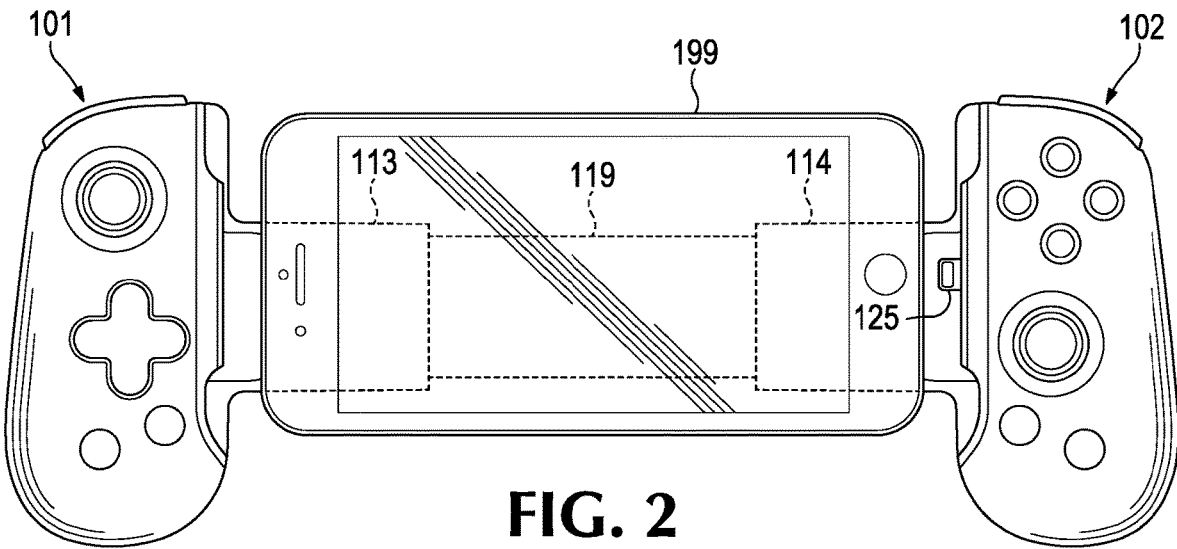
FIGS. 2-4 are each top views of the game controller of FIG. 1, collectively showing an example process of how the game controller may contact and support an example mobile device.
Figure 3:
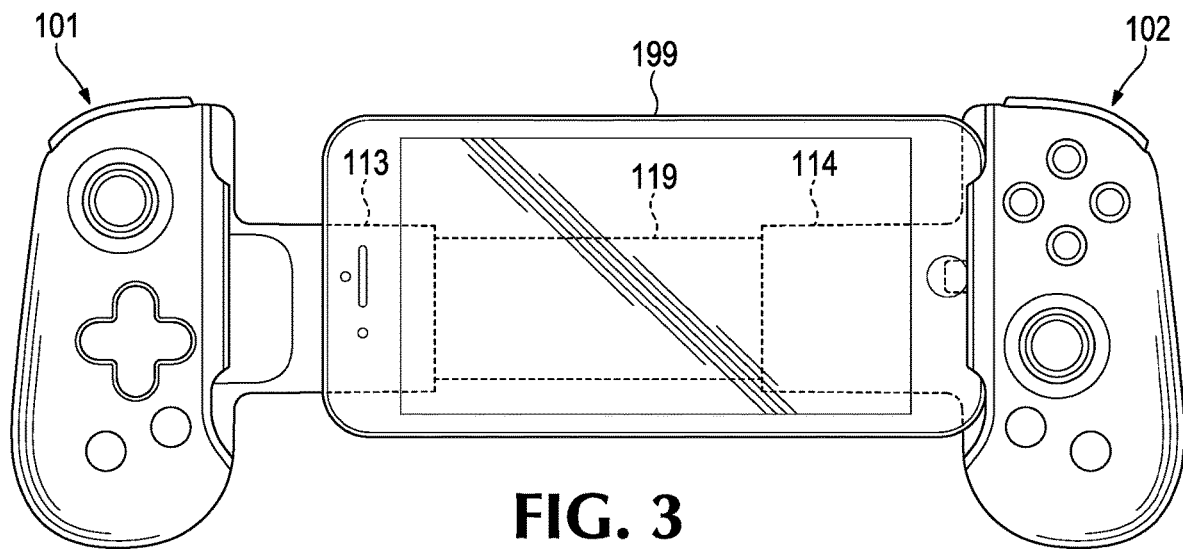
Figure 4:
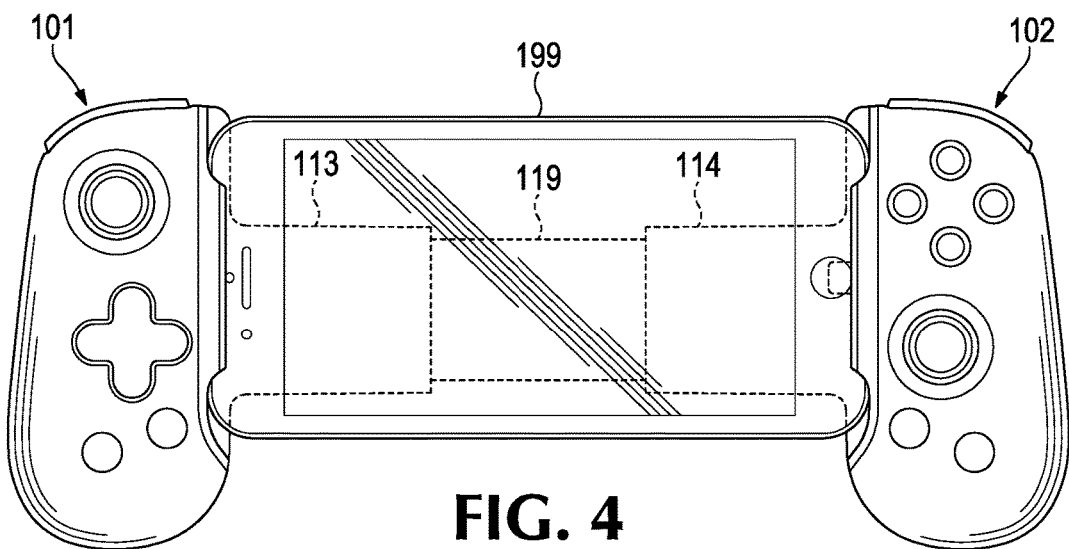

FIGS. 2-4 are top views of the game controller 100 of FIG. 1, showing an example process of how the game controller 100 may contact and support an example mobile device 199. As illustrated in FIG. 2, the mobile device 199 may be placed over the bridge 119, between the first handle 101 and the second handle 102 of the game controller 100. As illustrated in FIG. 3, the connector 125 of the game controller 100 may be joined with a corresponding connector on the mobile device 199. FIGS. 2 and 3 show examples of an extended configuration of the game controller 100. In FIG. 4, the mobile device 199 is secured between the first handle 101 and the second handle 102 of the game controller 100. FIG. 4 illustrates an example of a retracted configuration of the game controller 100. The extended configuration and the retracted configuration of the game controller 100 will be described in more detail below. The reader will note, though, that there is more than one retracted configuration. For example, FIG. 4 illustrates an example of a retracted configuration when the game controller 100 is securing a mobile device 199. As another example, FIG. 5 (described below) illustrates an example of a retracted configuration when the game controller 100 is not securing a mobile device 199.

FIG. 5 is a front, partial sectional view of the game controller 100 of FIG. 1 in an example of a retracted configuration of the game controller 100. FIG. 6 is a front, partial sectional view of the game controller 100 of FIG. 1 in an example of an extended configuration of the game controller 100. As illustrated in FIGS. 5-6, a game controller 100 may include a first handle 101, a second handle 102, and a bridge 119, each as described above for FIGS. 1-4. In each of FIGS. 5-6, external portions of the first handle 101, the second handle 102, and the bridge 119 are not shown to make certain internal features visible.

As illustrated, the bridge 119 is in sliding engagement with the first handle 101. As illustrated, the bridge 119 is not telescoping, meaning that segments of the bridge 119 do not slide within another segment of the bridge 119 to allow for lengthening or shortening of the bridge 119. The bridge 119 has a span 120 extending away from the main body portion 105 of the first handle 101, and the span 120 has a transverse midline 121.

The bridge 119 and the first handle 101 are configured to allow the main body portion 105 of the first handle 101 to translate in a retraction direction 122 toward the midline 121 of the bridge 119 and into a retracted configuration, such as one of the example retracted configurations illustrated in FIG. 4 or 5. The bridge 119 and the first handle 101 are configured to allow the main body portion 105 of the first handle 101 to also translate in an extension direction 123 away from the midline 121 of the bridge 119 into an extended configuration, such as one of the example extended configurations illustrated in FIG. 2 or 6.

As used in this disclosure, the transverse midline 121 of the bridge 119 is a reference datum used to define the extension direction 123 and the retraction direction 122. That is, the retraction direction 122 is toward the transverse midline 121, while the retraction direction 122 is away from the transverse midline 121. Accordingly, the transverse midline 121 of the bridge 119 may or may not coincide with a physical structure on the game controller 100.

Likewise, the bridge 119, as illustrated, is in sliding engagement with the second handle 102, and the span 120 of the bridge 119 extends away from the main body portion 106 of the second handle 102. The bridge 119 and the second handle 102 are configured to allow the main body portion 106 of the second handle 102 to translate in the retraction direction 122 toward the midline 121 of the bridge 119 and into the retracted configuration. The bridge 119 and the second handle 102 are configured to allow the main body portion 106 of the second handle 102 to also translate in the extension direction 123 away from the midline 121 of the bridge 119 into the extended configuration.

As illustrated in FIGS. 5-6, the game controller 100 may also include a first spring mechanism 107, a second spring mechanism 108, a first latch mechanism 109, a second latch mechanism 110, a first linear rack 111, a second linear rack 112, and a pinion 124. These are described below.

The first spring mechanism 107 is configured to bias the first handle 101 toward the retracted configuration. In addition, the first spring mechanism 107 exerts a first retraction force on the first latch mechanism 109 in the retraction direction 122. As illustrated, the first spring mechanism 107 may be attached to the first handle 101 through a shaft 117 and is also attached to the bridge 119. The first spring mechanism 107 may be or include a first constant-load spring connecting the first handle 101 to the bridge 119. The first constant-load spring is configured to exert a substantially constant force on the first handle 101 in the retraction direction 122. As used in this disclosure, "substantially constant" means largely or essentially invariable, yet without requiring perfect constancy, as the game controller 100 transitions from the retracted configuration to the extended configuration and from the extended configuration to the retracted configuration.

The second spring mechanism 108 is configured to bias the second handle 102 toward the retracted configuration. In addition, the second spring mechanism 108 exerts a second retraction force on the second latch mechanism 110 in the retraction direction 122. As illustrated, the second spring mechanism 108 is attached to the second handle 102 through a shaft 118 and is also attached to the bridge 119. The second spring mechanism 108 may be or include a second constant-load spring connecting the second handle 102 to the bridge 119. The second constant-load spring is configured to exert a substantially constant force on the second handle 102 in the retraction direction 122.

The first latch mechanism 109 is configured to temporarily lock the bridge 119 in the extended configuration. The first latch mechanism 109 is further configured to require a first disengagement force in the retraction direction 122 to unlock the bridge 119 from the extended configuration. The first disengagement force is greater than the first retraction force exerted by the first spring mechanism 107 in the retraction direction 122. The additional force (that is, that portion of the first disengagement force that exceeds the first retraction force) may be provided by, for example, pressure from the user's hands exerted in the retraction direction 122.

Likewise, the second latch mechanism 110 is configured to temporarily lock the bridge 119 in the extended configuration. The second latch mechanism 110 is further configured to require a second disengagement force in the retraction direction 122 to unlock the bridge 119 from the extended configuration. The second disengagement force is greater than the second retraction force exerted by the second spring mechanism 108 in the retraction direction 122. The additional force (that is, that portion of the second disengagement force that exceeds the second retraction force) may be provided by, for example, pressure from the user's hands exerted in the retraction direction 122.

As illustrated, the first linear rack 111 is coupled to the first handle 101 and is in sliding engagement with the bridge 119. The first linear rack 111 extends substantially along the span 120 of the bridge 119. As used in this disclosure, "substantially along" means largely or essentially in the direction of, without requiring perfect conformity. The first linear rack 111 may further include a step 126 or indentation, which may engage with the first latch mechanism 109 as described more fully below. As used in this disclosure, "to engage" means "to interlock with; to fit together."

The second linear rack 112 is coupled to the second handle 102 and is in sliding engagement with the bridge 119. The second linear rack 112 extends substantially along the span 120 of the bridge 119. The second linear rack 112 may further include a step 126, which may engage with the second latch mechanism 110 as described more fully below.

As illustrated, the pinion 124 is affixed to the bridge 119. The pinion 124 is in contact with each of the first linear rack 111 and the second linear rack 112. The pinion 124 is configured to rotate relative to the bridge 119 as the first linear rack 111 is translated relative to the pinion 124. The pinion 124 is also configured to rotate as the second linear rack 112 is translated relative to the pinion 124.

Figure 7:
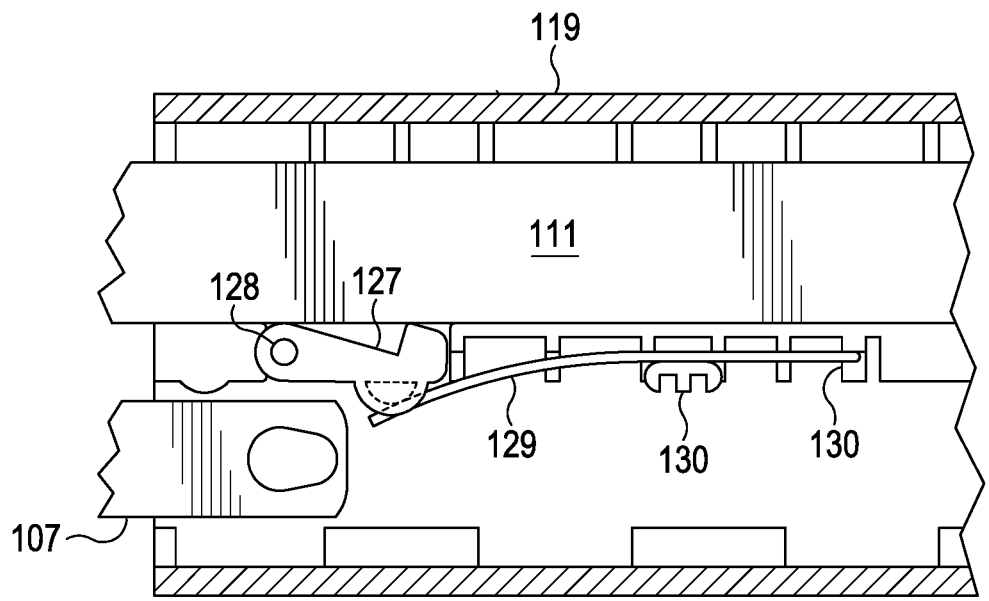
FIG. 7 is a close-up of a portion of the game controller of FIGS. 5 and 6, illustrating an example latch mechanism in an unlatched configuration.
Figure 8:
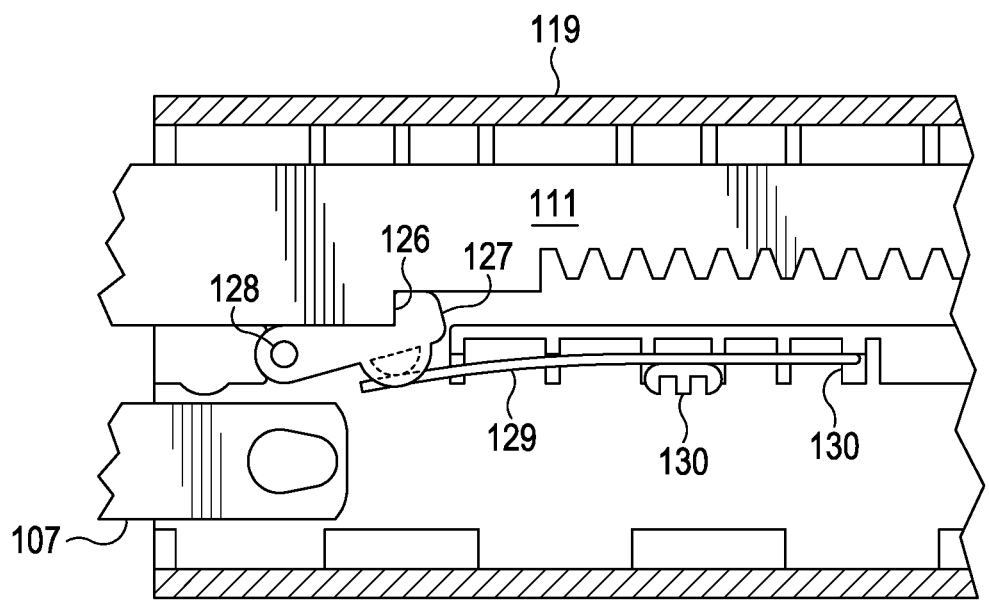
FIG. 8 is a close-up of a portion of the game controller of FIGS. 5 and 6, illustrating the example latch mechanism of FIG. 7 in a latched configuration.

FIG. 7 is a close-up of a portion of the game controller 100 of FIGS. 5 and 6, illustrating an example latch mechanism in an unlatched configuration. FIG. 8 is a close-up of a portion of the game controller 100 of FIGS. 5 and 6, illustrating the example latch mechanism of FIG. 7 in a latched configuration. While illustrated and described for the first-handle side of the game controller 100, the discussion for FIGS. 7 and 8 applies equally to the second-handle side of the game controller 100. Hence, the example latch mechanism of FIGS. 7 and 8 may be the first latch mechanism 109 described above for FIGS. 5 and 6, the second latch mechanism 110 described above for FIGS. 5 and 6, or both the first latch mechanism 109 and the second latch mechanism 110.

As illustrated in FIGS. 7 and 8, the example latch mechanism may include a catch 127 coupled to the bridge 119. The catch 127 is configured to contact and engage the step 126 on the first linear rack 111 in the extended configuration and disengage from the step 126 on the first linear rack 111 in the retracted configuration. To facilitate the engagement and disengagement of the catch 127 from the step 126, the step 126 may be angled or rounded, or a portion of the catch 127 facing the step 126 may be angled or rounded, or both.

As illustrated, the catch 127 is coupled to the bridge 119 through a pivot 128. The first latch mechanism 109 may also include a cantilevered spring 129 configured to apply a torque to the catch 127 about the pivot 128 to bias the catch 127 against the first linear rack 111. The cantilevered spring 129 may be coupled to the bridge 119 by one or more attachment points 130.

With particular reference to FIGS. 2-8, in use the game controller 100 may initially be in a retracted configuration, such as the retracted configuration illustrated in FIG. 5. In the retracted configuration, the catch 127 is disengaged from the step 126 on the first linear rack 111. In versions having a catch 127 on a second linear rack 112 (also or instead of the catch 127 on the first linear rack 111), in the retracted configuration, the catch 127 is disengaged from the step 126 on the second linear rack 112.

Then, the user may apply a force (using, for example, the user's hands) to the first handle 101 or the second handle 102, or both, in the extension direction 123 to move the game controller 100 into an extended configuration, such as the extended configurations illustrated in FIGS. 1, 2, and 6. In other words, the user may pull the first handle 101 and the second handle 102 apart from each other.

In transitioning to the extended configuration, the first linear rack 111 slides relative to the catch 127 for the first end 115 of the span 120 until that catch 127 is aligned with the step 126 in the first linear rack 111. During the transition, the first spring mechanism 107 continues to bias the first handle 101 toward the retracted configuration and exerts a first retraction force on the first latch mechanism 109 in the retraction direction 122. The cantilevered spring 129 then causes the catch 127 for the first end 115 of the span 120 to engage the step 126 of the first linear rack 111 by forcing the catch 127 into the step 126. The first latch mechanism 109 is now temporarily locking the bridge 119 in the extended configuration by way of the catch 127.

In versions having a catch 127 on a second linear rack 112 (also or instead of the catch 127 on the first linear rack 111), in transitioning to the extended configuration, the second linear rack 112 slides relative to the catch 127 for the second end 116 of the span 120 until the catch 127 is aligned with the step 126 in the second linear rack 112. During the transition, the second spring mechanism 108 continues to bias the second handle 102 toward the retracted configuration and exerts a second retraction force on the second latch mechanism 110 in the retraction direction 122. The cantilevered spring 129 then causes the catch 127 for the second end 116 of the span 120 to engage the step 126 of the second linear rack 112 by forcing the catch 127 into the step 126. The second latch mechanism 110 is now temporarily locking the bridge 119 in the extended configuration by way of the catch 127.

With the bridge 119 temporarily locked in the extended configuration, the user may then insert a mobile device 199 into the game controller 100 by placing the mobile device 199 over the bridge 119, such as illustrated in FIG. 2. If necessary, the connector 125 of the game controller 100 may then be joined with a corresponding connector on the mobile device 199, such as illustrated in FIG. 3.

To unlock the hold-open feature, where the bridge 119 is temporarily locked in the extended configuration, and return the game controller 100 to a retracted configuration, the user typically applies a force to the first handle 101 in the retraction direction 122. This user-applied force, coupled with the first retraction force exerted by the first spring mechanism 107, causes the catch 127 for the first end 115 of the span 120 to disengage from the step 126 in the first linear rack 111. Once disengaged, the first retraction force exerted by the first spring mechanism 107 causes the game controller 100 to transition to a retracted configuration.

In versions having a catch 127 on a second linear rack 112 (also or instead of the catch 127 on the first linear rack 111), the user may apply a force to the second handle 102 in the retraction direction 122. This user-applied force, coupled with the second retraction force exerted by the second spring mechanism 108, causes the catch 127 for the second end 116 of the span 120 to disengage from the step 126 in the second linear rack 112. Once disengaged, the second retraction force exerted by the second spring mechanism 108 causes the game controller 100 to transition to a retracted configuration.

Since moving the game controller 100 from the retracted configuration to the extended configuration is often done by using both of the user's hands (such as, for example, one hand on each of the first handle 101 and the second handle 102), the hold-open feature allows the user—once the game controller 100 is temporarily locked in the extended configuration—to remove one or both of the user's hands from the game controller 100 (such as, for example, from either the first handle 101 or the second handle 102, or both) to manipulate the mobile device 199 into position, such as the position illustrated in FIG. 2. Hence, embodiments of the disclosed technology allow the user to efficiently and easily insert and remove a mobile device 199 from the game controller 100.

Figure 9:
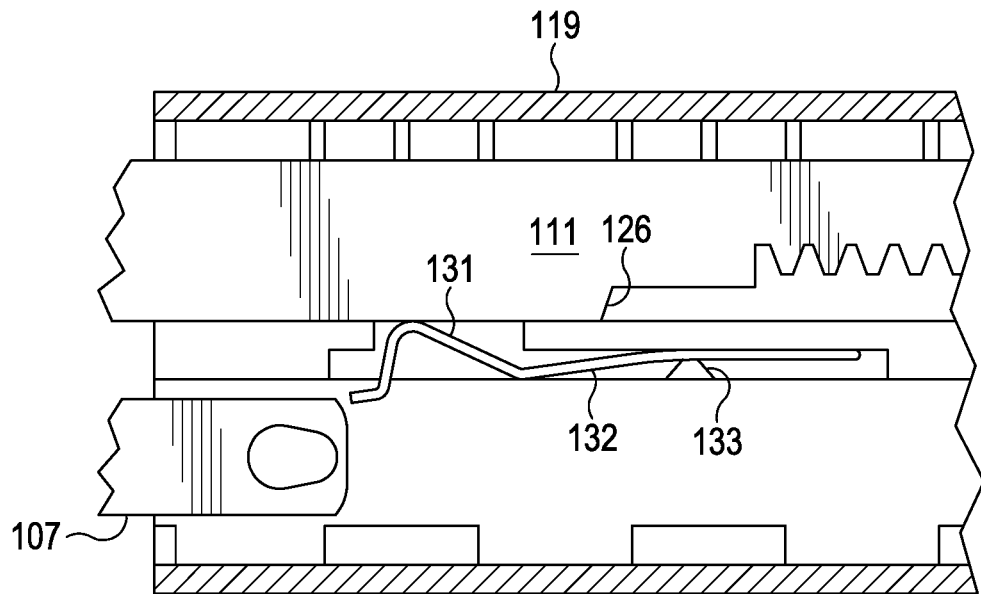
FIG. 9 is a close-up of a portion of a first alternative arrangement for the game controller of FIGS. 5 and 6, illustrating an example latch mechanism in an unlatched configuration.
Figure 10:
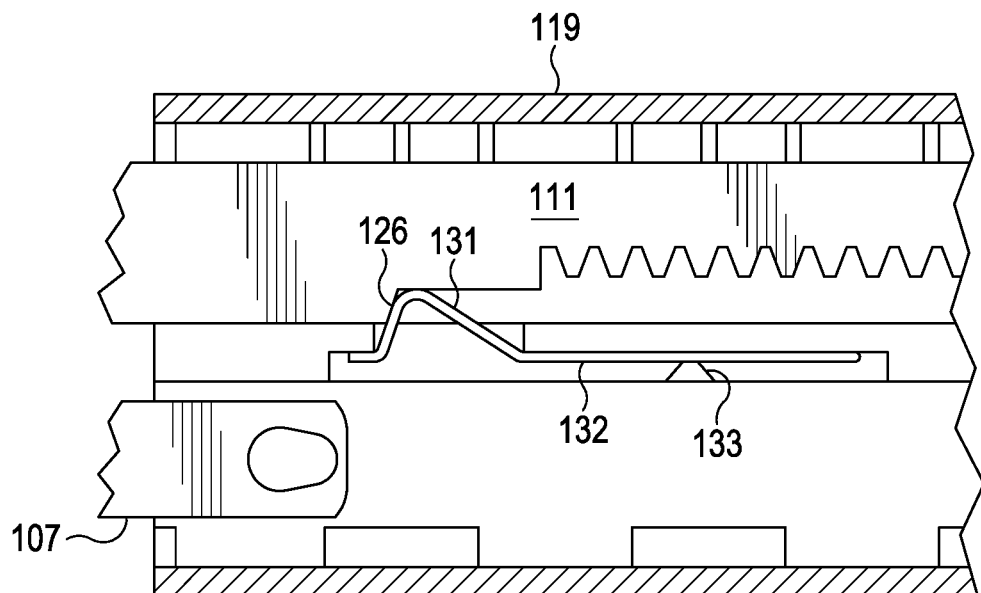
FIG. 10 is a close-up of a portion of a first alternative arrangement for the game controller of FIGS. 5 and 6, illustrating the example latch mechanism of FIG. 9 in a latched configuration.

FIG. 9 is a close-up of a portion of an alternative arrangement for the game controller 100 of FIGS. 5 and 6, illustrating an example latch mechanism in an unlatched configuration. FIG. 10 is a close-up of a portion of an alternative arrangement for the game controller 100 of FIGS. 5 and 6, illustrating the example latch mechanism of FIG. 9 in a latched configuration. While illustrated and described for the first-handle side of the game controller 100, the discussion for FIGS. 9 and 10 applies equally to the second-handle side of the game controller 100. Hence, the example latch mechanism of FIGS. 9 and 10 may be the first latch mechanism 109 described above for FIGS. 5 and 6, the second latch mechanism 110 described above for FIGS. 5 and 6, or both the first latch mechanism 109 and the second latch mechanism 110.

As illustrated in FIGS. 9 and 10, the example latch mechanism may include a tension spring 132 coupled to the bridge 119. An engagement portion 131 of the tension spring 132 is configured to contact and engage the step 126 on the first linear rack 111 in the extended configuration and disengage from the step 126 on the first linear rack 111 in the retracted configuration. To facilitate the engagement and disengagement of the catch 127 from the step 126, the step 126 may be angled or rounded.

As illustrated, the tension spring 132 is coupled to the bridge 119 through one or more attachment points 133. The tension spring 132 is configured to bias the engagement portion 131 of the tension spring 132 against the first linear rack 111. The engagement portion 131 is configured to engage the step 126 in the extended configuration.

Accordingly, in transitioning from the retracted configuration (an example of which is illustrated in FIG. 9) to the extended configuration (an example of which is illustrated in FIG. 10), the first linear rack 111 slides relative to the engagement portion 131 of the tension spring 132 until the engagement portion 131 is aligned with the step 126 in the first linear rack 111. The tension spring 132 then causes the engagement portion 131 to engage the step 126 of the first linear rack 111 by forcing the engagement portion 131 into the step 126. Likewise, in transitioning from the extended configuration to the retracted configuration, the engagement portion 131 of the tension spring 132 is disengaged from the step 126 in the first linear rack 111. Otherwise, operation of this example latch mechanism is substantially as described above for FIGS. 2-8.

Figure 11:
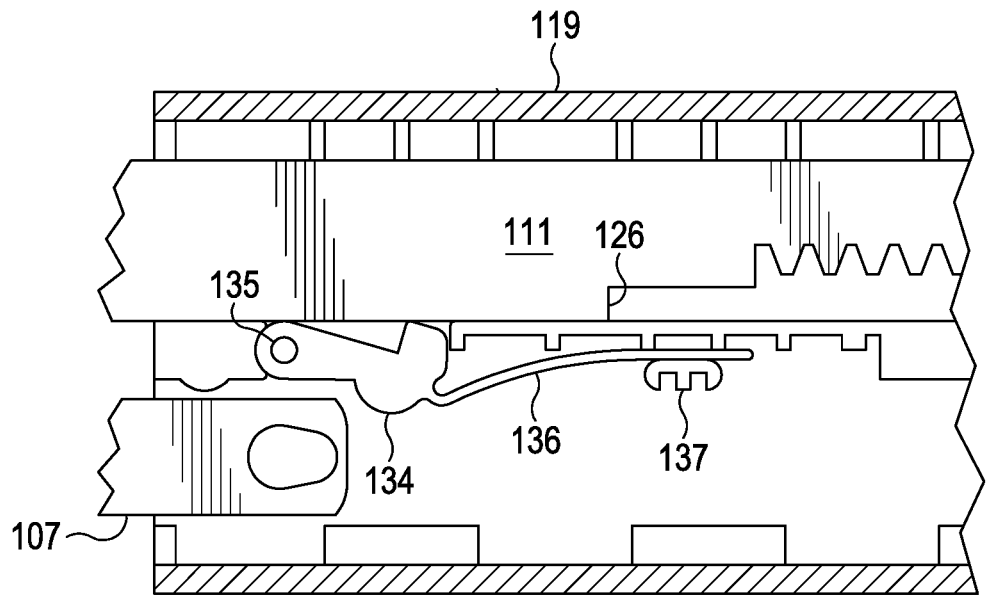
FIG. 11 is a close-up of a portion of a second alternative arrangement for the game controller of FIGS. 5 and 6, illustrating an example latch mechanism in an unlatched configuration.
Figure 12:
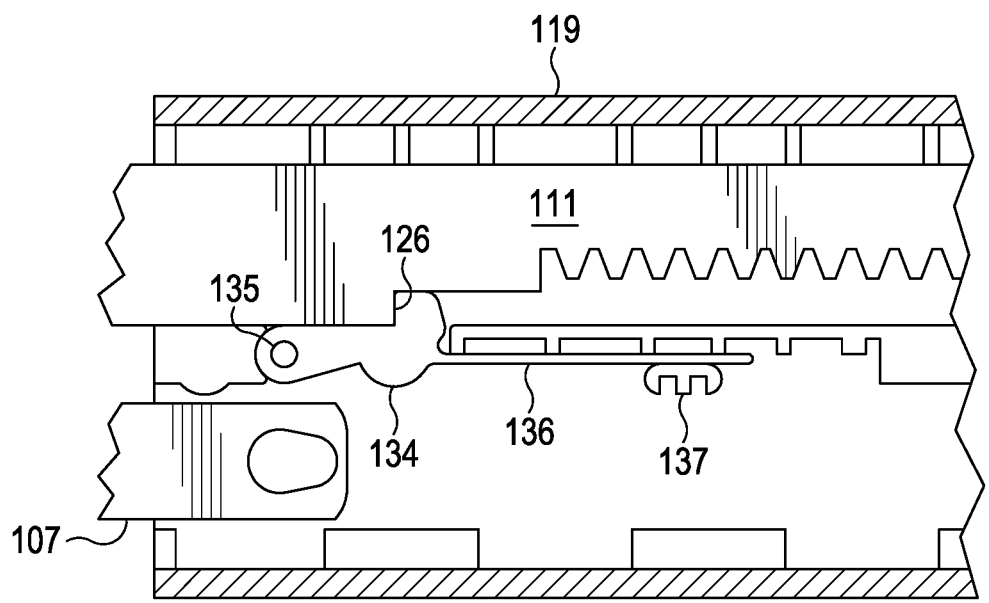
FIG. 12 is a close-up of a portion of a second alternative arrangement for the game controller of FIGS. 5 and 6, illustrating the example latch mechanism of FIG. 11 in a latched configuration.

FIG. 11 is a close-up of a portion of an alternative arrangement for the game controller 100 of FIGS. 5 and 6, illustrating an example latch mechanism in an unlatched configuration. FIG. 12 is a close-up of a portion of an alternative arrangement for the game controller 100 of FIGS. 5 and 6, illustrating the example latch mechanism of FIG. 11 in a latched configuration. While illustrated and described for the first-handle side of the game controller 100, the discussion for FIGS. 11 and 12 applies equally to the second-handle side of the game controller 100. Hence, the example latch mechanism of FIGS. 11 and 12 may be the first latch mechanism 109 described above for FIGS. 5 and 6, the second latch mechanism 110 described above for FIGS. 5 and 6, or both the first latch mechanism 109 and the second latch mechanism 110.

As illustrated in FIGS. 11 and 12, the example latch mechanism may include a catch 134 coupled to the bridge 119. The catch 134 is configured to contact and engage the step 126 on the first linear rack 111 in the extended configuration and disengage from the step 126 on the first linear rack 111 in the retracted configuration. To facilitate the engagement and disengagement of the catch 134 from the step 126, the step 126 may be angled or rounded, or a portion of the catch 134 facing the step 126 may be angled or rounded, or both.

As illustrated, the catch 134 is coupled to the bridge 119 through a pivot 135. The first latch mechanism 109 may also include a cantilevered spring 136 configured to apply a torque to the catch 134 about the pivot 135 to bias the catch 134 against the first linear rack 111. As illustrated, the cantilevered spring 136 may be integral to and extend from the catch 134. Accordingly, the cantilevered spring 136 may be configured to slide through one or more guide points 137 of the bridge 119, which constrain an end of the cantilevered spring 136 opposite the catch 134.

Operation of this example latch mechanism is substantially as described above for FIGS. 2-8.

Figure 13:
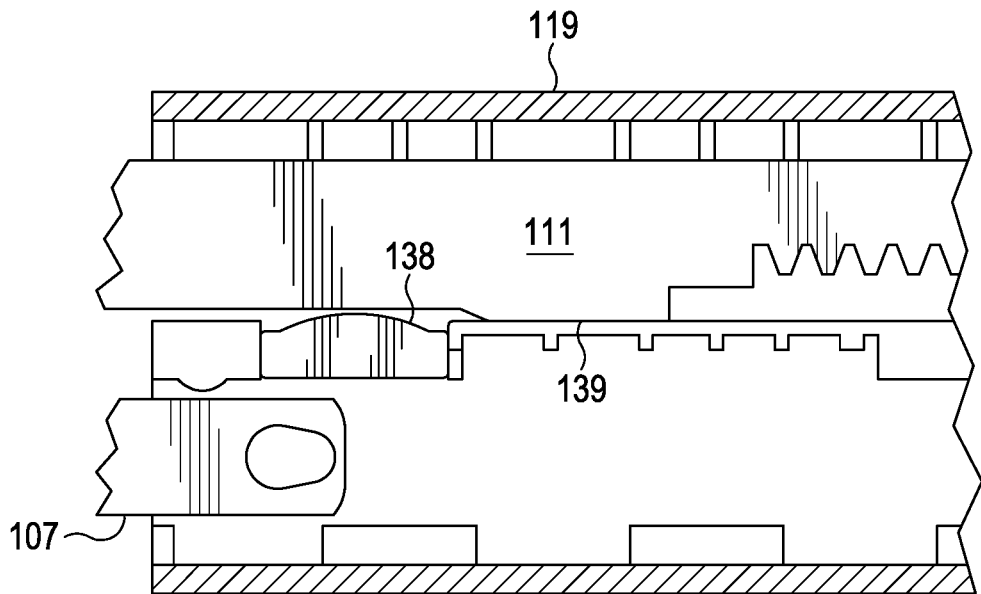
FIG. 13 is a close-up of a portion of a third alternative arrangement for the game controller of FIGS. 5 and 6, illustrating an example latch mechanism in an unlatched configuration.
Figure 14:
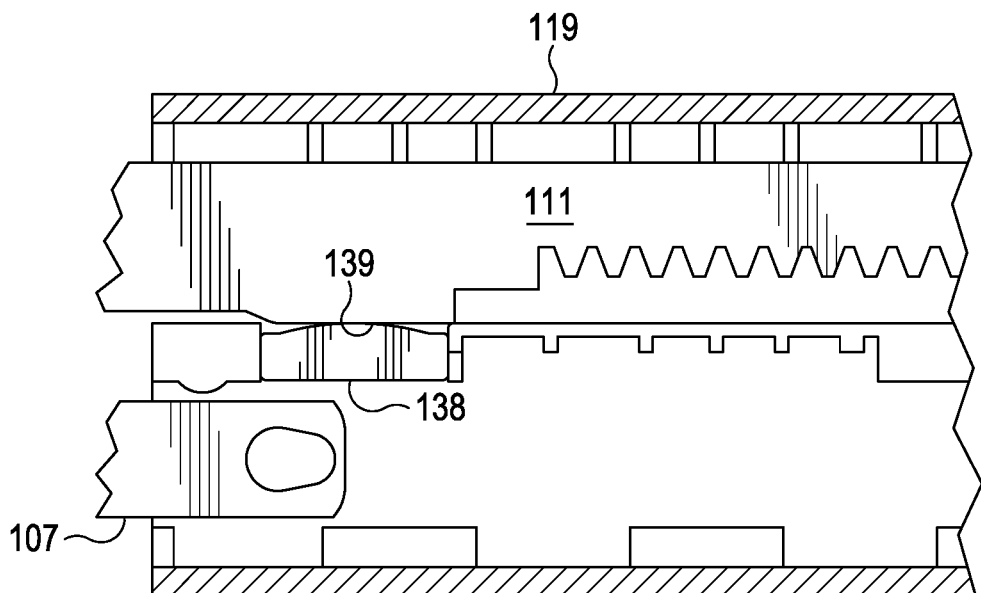
FIG. 14 is a close-up of a portion of a third alternative arrangement for the game controller of FIGS. 5 and 6, illustrating the example latch mechanism of FIG. 13 in a latched configuration.

FIG. 13 is a close-up of a portion of an alternative arrangement for the game controller 100 of FIGS. 5 and 6, illustrating an example latch mechanism in an unlatched configuration. FIG. 14 is a close-up of a portion of an alternative arrangement for the game controller 100 of FIGS. 5 and 6, illustrating the example latch mechanism of FIG. 13 in a latched configuration. While illustrated and described for the first-handle side of the game controller 100, the discussion for FIGS. 13 and 14 applies equally to the second-handle side of the game controller 100. Hence, the example latch mechanism of FIGS. 13 and 14 may be the first latch mechanism 109 described above for FIGS. 5 and 6, the second latch mechanism 110 described above for FIGS. 5 and 6, or both the first latch mechanism 109 and the second latch mechanism 110.

As illustrated in FIGS. 13 and 14, the example latch mechanism may include an elastic body 138 coupled to the bridge 119. The elastic body 138 is configured to contact and frictionally engage a raised portion 139 on the first linear rack 111 in the extended configuration and disengage from the raised portion 139 in the retracted configuration. To facilitate the engagement and disengagement of the elastic body 138 from the raised portion 139, the raised portion 139 may be angled or rounded, or the raised portion 139 may be angled or rounded, or both. As illustrated, the elastic body 138 is configured to elastically distort when engaged with the raised portion 139 of the first linear rack 111.

Accordingly, in transitioning from the retracted configuration (an example of which is illustrated in FIG. 13) to the extended configuration (an example of which is illustrated in FIG. 14), the first linear rack 111 slides relative to the elastic body 138 until the elastic body 138 contacts the raised portion 139 of the first linear rack 111. The elastic body 138 then elastically distorts and frictionally engages the raised portion 139 on the first linear rack 111. Likewise, in transitioning from the extended configuration to the retracted configuration, the elastic body 138 is disengaged from the raised portion 139 of the first linear rack 111. Otherwise, operation of this example latch mechanism is substantially as described above for FIGS. 2-8.

Figure 15:
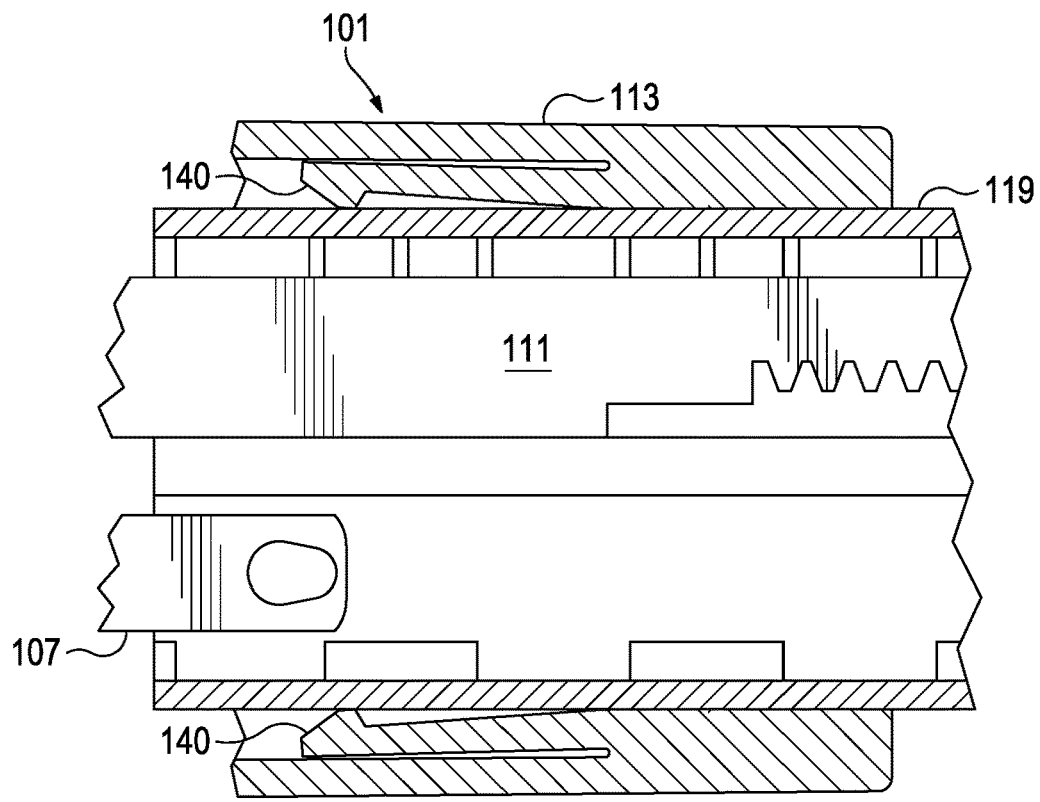
FIG. 15 is a close-up of a portion of a fourth alternative arrangement for the game controller of FIGS. 5 and 6, illustrating an example latch mechanism in an unlatched configuration.
Figure 16:
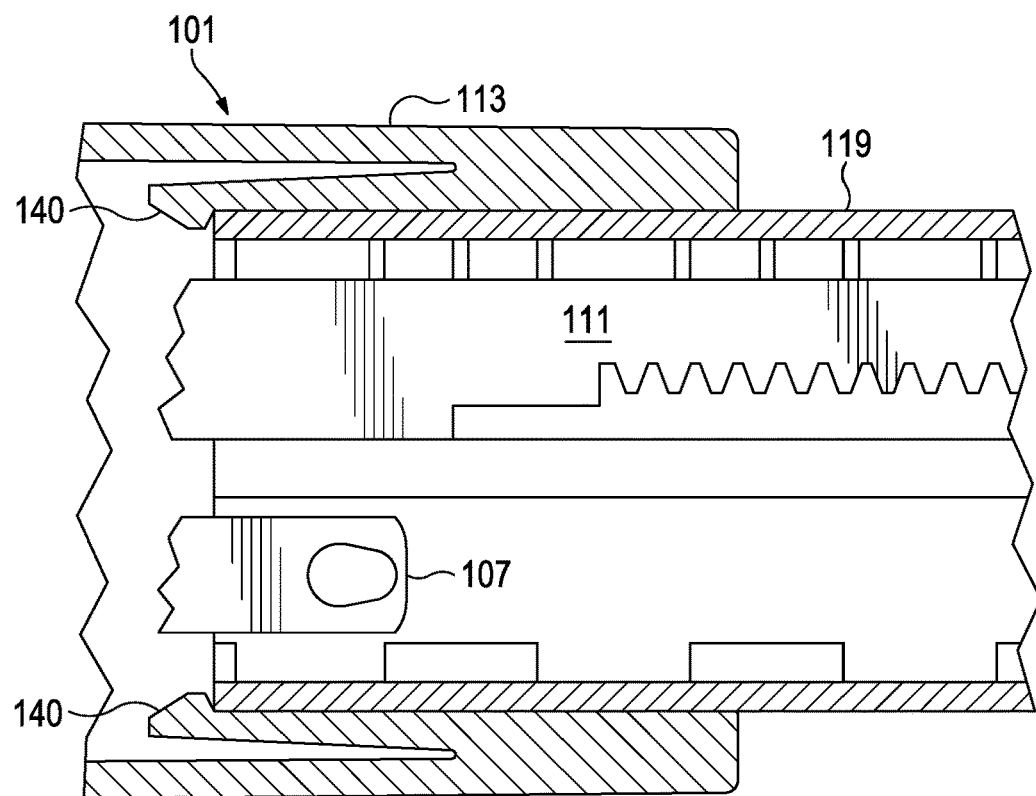
FIG. 16 is a close-up of a portion of a fourth alternative arrangement for the game controller of FIGS. 5 and 6, illustrating the example latch mechanism of FIG. 15 in a latched configuration.

FIG. 15 is a close-up of a portion of an alternative arrangement for the game controller 100 of FIGS. 5 and 6, illustrating an example latch mechanism in an unlatched configuration. FIG. 16 is a close-up of a portion of an alternative arrangement for the game controller 100 of FIGS. 5 and 6, illustrating the example latch mechanism of FIG. 15 in a latched configuration. While illustrated and described for the first-handle side of the game controller 100, the discussion for FIGS. 15 and 16 applies equally to the second-handle side of the game controller 100. Hence, the example latch mechanism of FIGS. 15 and 16 may be the first latch mechanism 109 described above for FIGS. 5 and 6, the second latch mechanism 110 described above for FIGS. 5 and 6, or both the first latch mechanism 109 and the second latch mechanism 110.

As illustrated in FIGS. 15 and 16, the example latch mechanism may include one or more resilient clips 140 on the first handle 101. As illustrated, the resilient clip 140 may be within the guide portion 113 of the first handle 101. The resilient clip 140 is configured to contact and engage an outer edge of the bridge 119 in the extended configuration and to disengage from the outer edge of the bridge 119 in the retracted configuration. To facilitate the engagement and disengagement of the resilient clip 140 from the outer edge of the bridge 119, the resilient clip 140 may be angled or rounded, the outer edge may be angled or rounded, or both. The resilient clip 140 is biased against the outer edge of the bridge 119. As illustrated in FIG. 15, the resilient clips 140 may be disengaged from the outer edge of the bridge 119 while still being in contact with the outer edge.

As illustrated in FIG. 16, the resilient clip 140 engages a terminus of the bridge 119. In other embodiments, the resilient clip 140 may engage an indentation or step on the outer edge of the bridge 119, the indentation or step not being at the terminus of the bridge 119.

Alternatively, one or more resilient clips 140 may be on the bridge 119 and be configured to contact and engage the first handle 101 in the extended configuration and to disengage from the first handle 101 in the retracted configuration.

With specific reference to the embodiment illustrated in FIGS. 15 and 16, in transitioning from the retracted configuration (an example of which is illustrated in FIG. 15) to the extended configuration (an example of which is illustrated in FIG. 16), the bridge 119 slides relative to the first handle 101 until the resilient clip 140 engages the terminus of the bridge 119. Likewise, in transitioning from the extended configuration to the retracted configuration, the resilient clip 140 is disengaged from the terminus of the bridge 119. Otherwise, operation of this example latch mechanism is analogous to what is described above for FIGS. 2-8.

Figure 17:
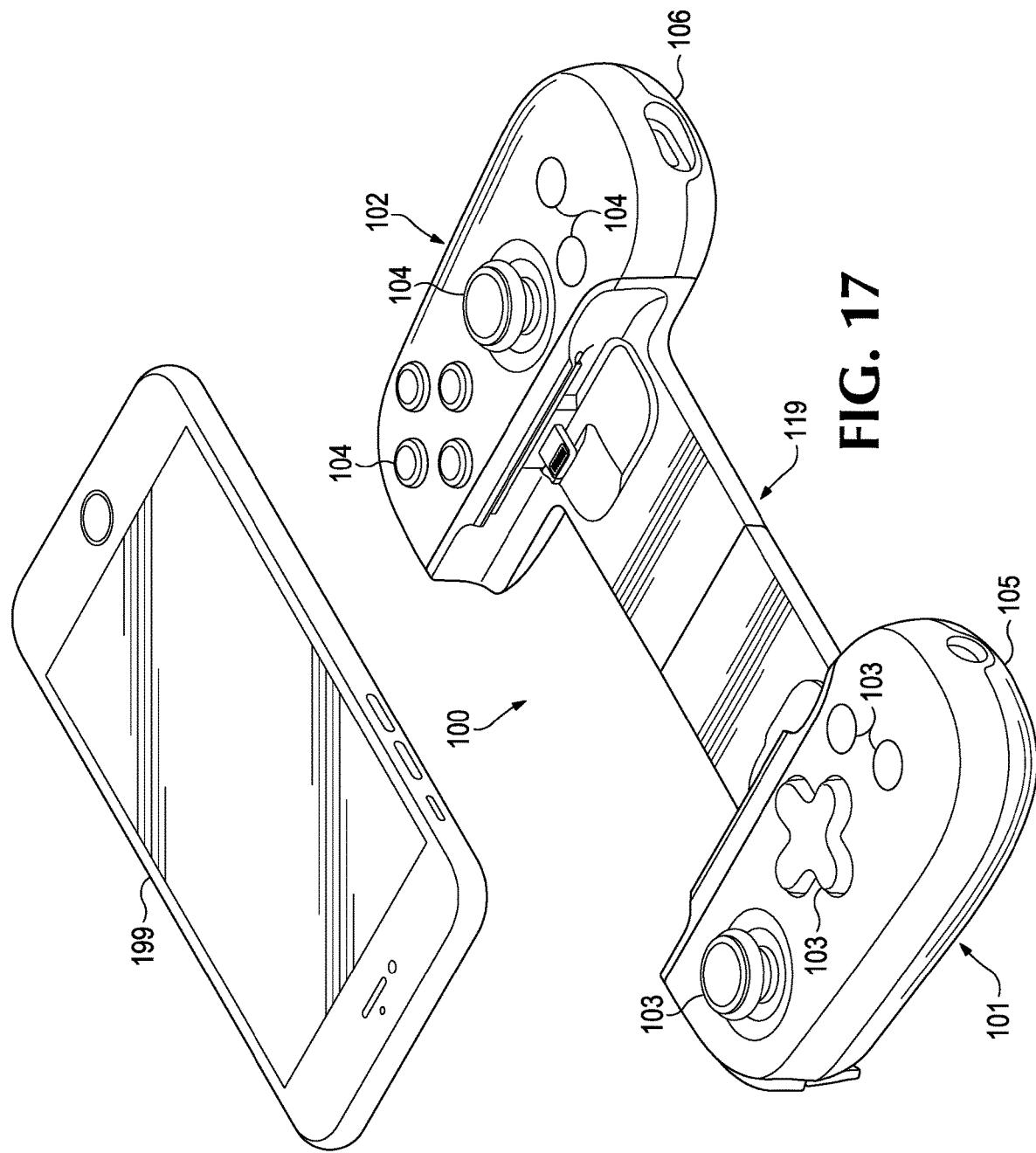
FIG. 17 is a top, perspective view of the game controller of FIG. 1 in an example of a retracted configuration of the game controller and illustrated next to an example mobile device.
Figure 18:
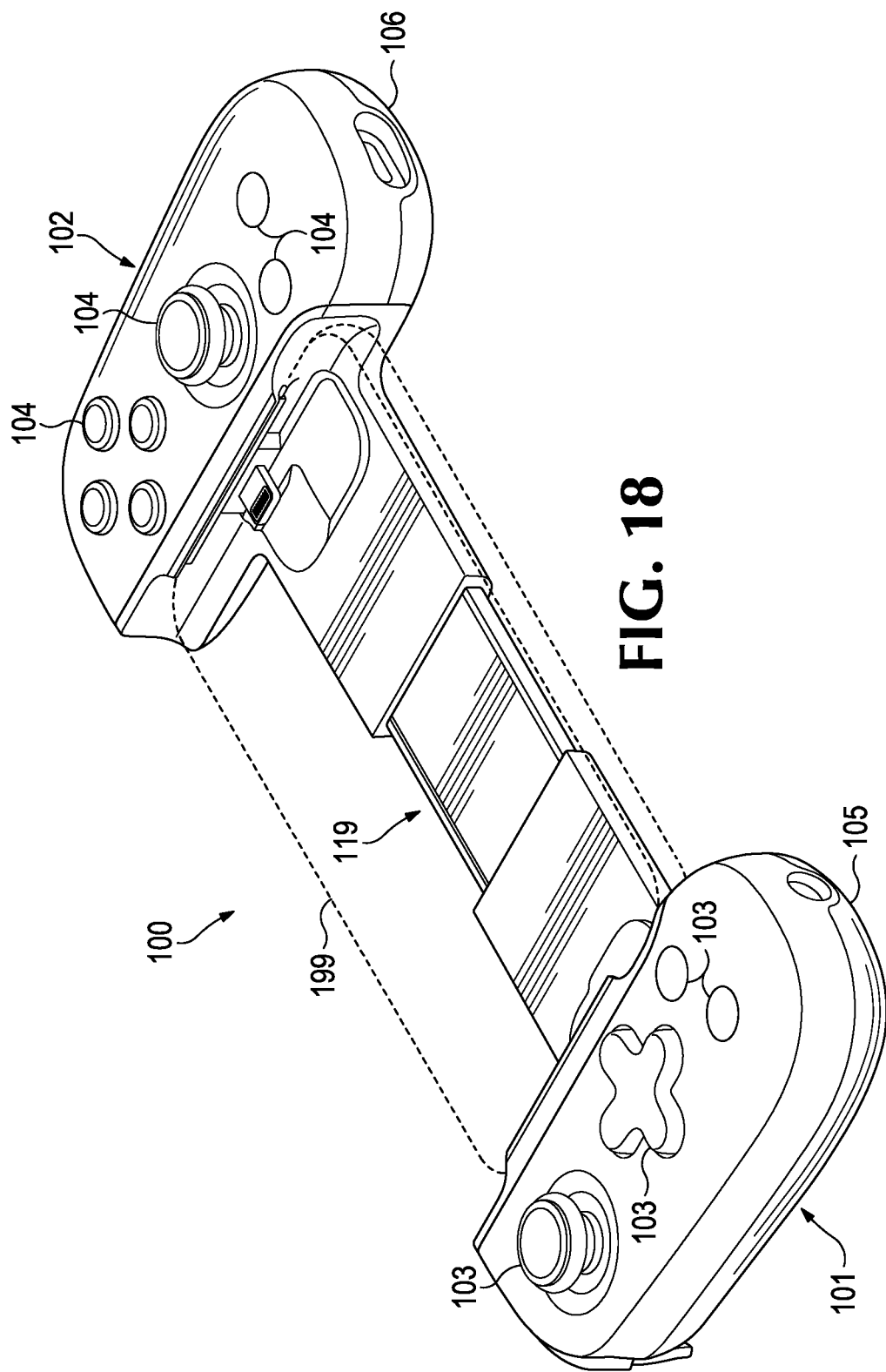
FIG. 18 is a top, perspective view of the game controller of FIG. 17, in an example of an extended configuration of the game controller and illustrating how the example mobile device fits into the game controller in configurations.

FIG. 17 is a top, perspective view of the game controller 100 of FIG. 1 in an example of a retracted configuration of the game controller and illustrated next to an example mobile device 199. FIG. 18 is a top, perspective view of the game controller 100 of FIG. 17, in an example of an extended configuration of the game controller 100 and illustrating how the example mobile device 199 fits into the game controller 100 in configurations. As illustrated in FIGS. 17 and 18, the game controller 100 includes the first handle 101, the second handle 102, and the bridge 119, each as discussed above. The configuration illustrated in FIGS. 17-23 may include any or all of the features discussed in this disclosure for other configurations of the game controller 100.

Figure 19:
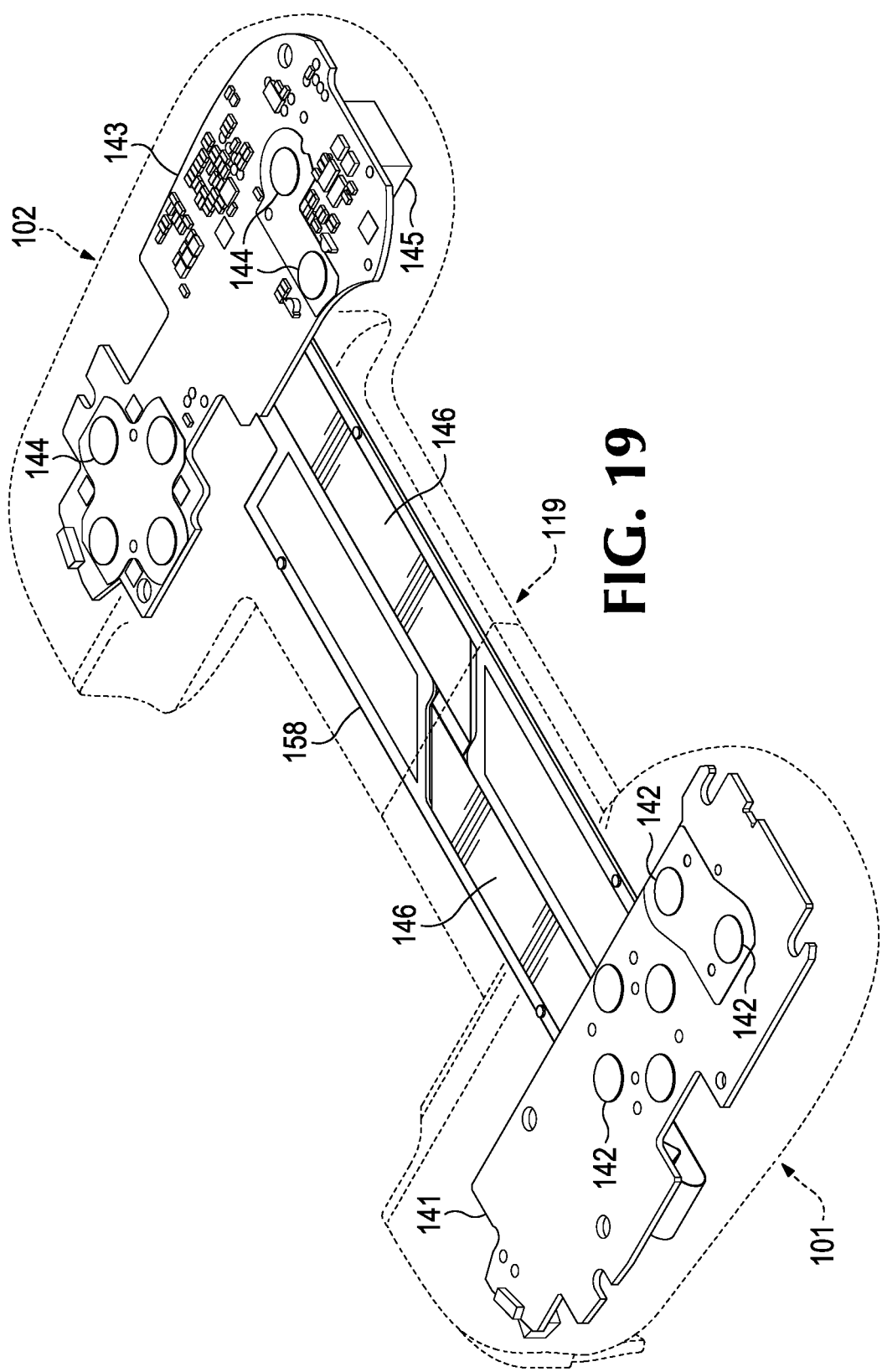
FIG. 19 is a top, perspective view of the game controller of FIG. 17, showing only certain features internal to the game controller.
Figure 20:
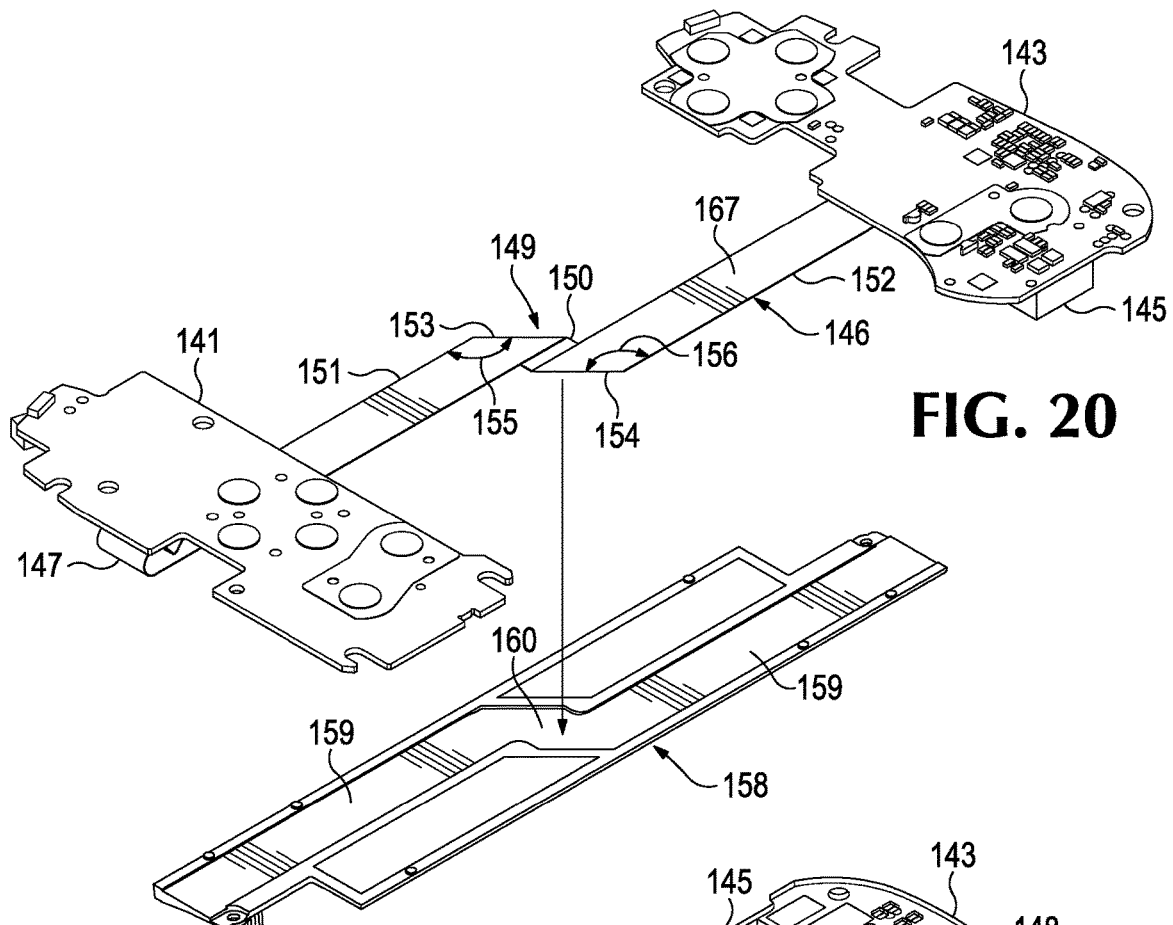
FIG. 20 is a partially exploded view of the game controller of FIG. 19.
Figure 21:
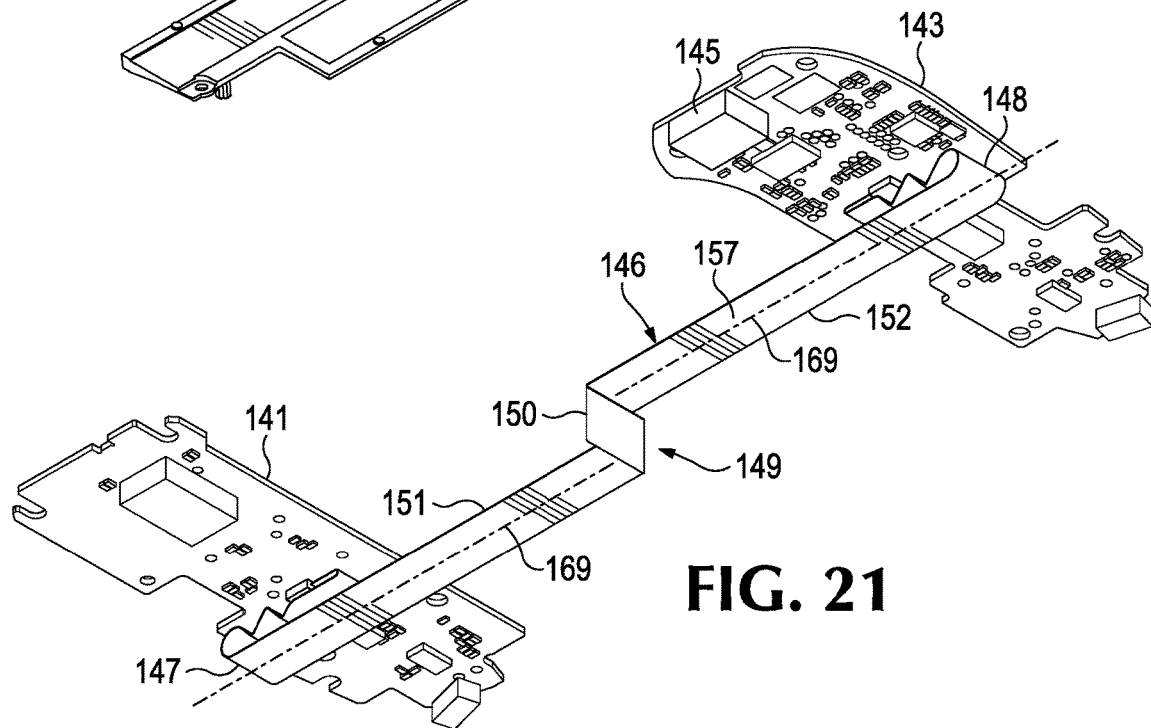
FIG. 21 is a bottom, perspective view of the game controller of FIG. 19.

FIG. 19 is a top, perspective view of the game controller 100 of FIG. 17, showing only certain features internal to the game controller 100. FIG. 20 is a partially exploded view of the game controller 100 of FIG. 19. FIG. 21 is a bottom, perspective view of the game controller 100 of FIG. 19.

As illustrated in FIGS. 19-21, the first handle 101 includes a first electronic circuit 141 that is coupled to the first hardware interface 103. For example, as illustrated in FIGS. 17 and 19, the first hardware interface 103 has a corresponding feature 142 of the first electronic circuit 141. The corresponding feature 142 of the first electronic circuit 141 is configured to translate a mechanical, touch input the first hardware interface 103 into an electrical signal. Hence, for example, the corresponding feature 142 of the first electronic circuit 141 may be an electronic switch.

Likewise, the second handle 102 includes a second electronic circuit 143 that is coupled to the second hardware interface 104. For example, as illustrated in FIGS. 17 and 19, the second hardware interface 104 has a corresponding feature 144 of the second electronic circuit 143. The corresponding feature 144 of the second electronic circuit 143 is configured to translate a mechanical, touch input the second hardware interface 104 into an electrical signal. Hence, for example, the corresponding feature 144 of the second electronic circuit 143 may be an electronic switch.

The second handle 102 further includes an electronic controller 145. The electronic controller 145 is configured to receive an electrical signal from the second electronic circuit 143. The electrical signal from the second electronic circuit 143 may be, for example, the electrical signal produced by the corresponding feature 144 of the second electronic circuit 143 in response to a touch input at the second hardware interface 104. The electronic controller 145 is also configured to receive an electrical signal from the first electronic circuit 141 via a flat, flexible cable 146. The electrical signal from the first electronic circuit 141 may be, for example, the electrical signal produced by the corresponding feature 142 of the first electronic circuit 141 in response to a touch input at the first hardware interface 103.

The flat, flexible cable 146 is configured to conduct an electrical signal between the first handle and the second handle. In configurations, the flat, flexible cable 146 is a flat and flexible plastic film base, with multiple, flat, metallic conductors bonded to one surface of the film base. As illustrated most clearly in FIG. 21, the flat, flexible cable 146 may be coupled at a first end 147 of the flat, flexible cable 146 to the first electronic circuit 141 and, at a second end 148 of the flat, flexible cable 146, to the second electronic circuit 143.

As illustrated most clearly in FIG. 20, in configurations the flat, flexible cable 146 includes a double fold 149. In configurations, the double fold 149 may be at the midline 121 of the bridge 119. In the illustrated configuration, the double fold 149 includes a folded section 150. Between the folded section 150 and a first elongated section 151 of the flat, flexible cable 146 is a first fold 153. And between the folded section 150 and a second elongated section 152 of the flat, flexible cable 146 is a second fold 154.

As illustrated, the fold angle 155 of the first fold 153 and the fold angle 156 of the second fold 154 are substantially equal and are less than 180°. As used in this context, "substantially equal" means largely or essentially equivalent, without requiring perfect identicalness. Accordingly, the first elongated section 151 of the flat, flexible cable 146 and the second elongated section 152 of the flat, flexible cable 146 are substantially parallel. As used in this context, "substantially parallel" means largely or essentially equidistant at all points (if the longitudinal centerline 169 of each elongated section were conceptually extended), without requiring perfect parallelism.

Consequently, the folded section 150 is at an angle to each of the first elongated section 151 and the second elongated section 152 as defined by the fold angles. Stated another way, before it is folded, the flat, flexible cable 146 has a longitudinal centerline 169 midway between its edges. Once folded, the longitudinal centerline 169 running through the first elongated section 151 and the longitudinal centerline 169 running through the folded section 150 are and an angle to each other, that angle being related to the fold angles.

In configurations, including in the illustrated configuration, the double fold 149 causes the same side 157 of the flat, flexible cable 146 to double over onto itself for each of the first fold 153 and the second fold 154.

In configurations, the flat, flexible cable 146 is fixed to the bridge. The flat, flexible cable 146 may be fixed to the bridge by, for example, glue or another adhesive. In configurations, the flat, flexible cable 146 is fixed to the bridge at the midline of the bridge. Fixing the flat, flexible cable 146 to the bridge may help to prevent the flat, flexible cable 146 from sliding within the bridge 119 during normal use of the game controller 100, where the game controller 100 may be repeatedly moved between the retracted configuration and the extended configuration. In configurations where the flat, flexible cable 146 is fixed to the bridge, the bridge may or may not include the tray 158 (as describe below), the flat, flexible cable 146 may or may not include the double fold 149, and the tray 158 may or may not include the double jog 160 (described below).

As illustrated most clearly in FIG. 20, the bridge 119 may include a tray 158 that is configured to contain the flat, flexible cable 146 within the tray 158. As illustrated, the tray 158 may include a narrow conduit 159 that is slightly wider and taller than the flat, flexible cable 146 such that the flat, flexible cable 146 fits snugly within the tray 158. The tray 158 is configured to prevent the flat, flexible cable 146 from bunching during normal use of the game controller 100, where the game controller 100 may be repeatedly moved between the retracted configuration and the extended configuration.

In configurations, the tray 158 may include a double jog 160, or turn. The double jog 160 in the tray 158 is configured to snugly contain the double fold 149 of the flat, flexible cable 146. Accordingly, the double fold 149 of the flat, flexible cable 146 coincides with the double jog 160 in the tray 158. The combination of the double fold 149 and the double jog 160 help to prevent the flat, flexible cable 146 from sliding within the tray 158 (and, therefore, within the bridge 119) during normal use of the game controller 100, where the game controller 100 may be repeatedly moved between the retracted configuration and the extended configuration.

FIG. 22 is a front view of the game controller of FIG. 17, in the example of the retracted configuration of the game controller, and showing only certain features internal to the game controller. FIG. 23 is a front view of the game controller of FIG. 18, in the example of the extended configuration of the game controller, and showing only certain features internal to the game controller.

As illustrated in FIGS. 22 and 23, the flat, flexible cable 146 includes a first double loop 161 within the first handle 101, and the flat, flexible cable 146 includes a second double loop 162 within the second handle 102. As used in this context, a "double loop" means two loops, one following the other, the first of the two loops 163 having a center of curvature 164 that is on an opposite side of the flat, flexible cable 146 from the center of curvature 166 of the second of the two loops 165. As illustrated, the center of curvature 164 of the first of the two loops 163 is on the first side 157 of the flat, flexible cable 146, while the center of curvature 166 of the second of the two loops 165 is on a second side 167 of the flat, flexible cable 146, which is opposite the first side 157 of the flat, flexible cable 146.

The double loops encourage the flat, flexible cable 146 to bunch within the first handle 101 or the second handle 102, or both (namely, at the location of the first double loop 161 or the second double loop 162, or both) rather than elsewhere along the flat, flexible cable 146 when the game controller 100 is moved between the retracted configuration and the extended configuration. In configurations, the flat, flexible cable 146 may include the first double loop 161 but not the second double loop 162, the second double loop 162 but not the first double loop 161, neither the first double loop 161 nor the second double loop 162, or both the first double loop 161 and the second double loop 162.

In configurations, the flat, flexible cable 146 may include a crimped portion 168. The crimped portion 168 may, for example, be between the first of the two loops 163 and the second of the two loops 165. In such configurations, to crimped portion 168 encourages the flat, flexible cable 146 to bunch at the location of the crimped portion 168 rather than elsewhere along the flat, flexible cable 146 when the game controller 100 is moved between the retracted configuration and the extended configuration. As illustrated, the crimped portion 168 may be used in conjunction with the first double loop 161 or the second double loop 162, or both.

EXAMPLES

Illustrative examples of the disclosed technologies are provided below. An embodiment of the technologies may include one or more, and any combination of, the examples described below.

Example 1 includes a game controller for a mobile device, the game controller comprising: a first handle configured to contact and support a mobile device, the first handle comprising a user-accessible, first hardware interface on a main body portion of the first handle and configured to accept touch inputs; a second handle configured to contact and support the mobile device, the second handle comprising a user-accessible, second hardware interface on a main body portion of the second handle and configured to accept touch inputs; a bridge coupling the first handle to the second handle, the bridge being in sliding engagement with the first handle and the second handle; and a flat, flexible cable configured to conduct an electrical signal between the first handle and the second handle.

Example 2 includes the game controller of Example 1, further comprising: a first electronic circuit within the first handle, the first electronic circuit coupled to the first hardware interface; a second electronic circuit within the second handle, the second electronic circuit coupled to the second hardware interface; and an electronic controller in the second handle, the electronic controller configured to receive an electrical signal from the second electronic circuit within the second handle and to receive an electrical signal from the first electronic circuit within the first handle via the flat, flexible cable.

Example 3 includes the game controller of any of Examples 1-2, the bridge further comprising a tray configured to contain the flat, flexible cable within the tray.

Example 4 includes the game controller of Example 3, in which the flat, flexible cable includes a double fold, the double fold coinciding with a double jog in the tray.

Example 5 includes the game controller of any of Examples 1-4, in which the bridge has a span extending away from the main body portion of the first handle, the span having a transverse midline, the midline of the bridge being between the first handle and the second handle, the bridge and the first handle being configured for the main body portion of the first handle to translate in a retraction direction toward the midline of the bridge and into a retracted configuration and also to translate in an extension direction away from the midline of the bridge into an extended configuration, the bridge and the second handle being configured for the main body portion of the second handle to translate along the bridge in the retraction direction toward the midline of the bridge and into the retracted configuration and also to translate in the extension direction away from the midline of the bridge and into the extended configuration.

Example 6 includes the game controller of Example 5, in which the flat, flexible cable includes a double fold at the midline of the bridge.

Example 7 includes the game controller of Example 6, the bridge further comprising a tray configured to contain the flat, flexible cable within the tray, the double fold of the flat, flexible cable coinciding with a double jog in the tray.

Example 8 includes the game controller of any of Examples 5-7, in which the flat, flexible cable is fixed to the bridge at the midline of the bridge.

Example 9 includes the game controller of any of Examples 1-8, in which the flat, flexible cable includes a double loop within the first handle.

Example 10 includes the game controller of Example 9, in which the flat, flexible cable further includes a crimped portion between a first loop of the double loops and a second loop of the double loop.

Example 11 includes the game controller of any of Examples 1-10, in which the flat, flexible cable includes a double loop within the second handle.

Example 12 includes the game controller of Example 11, in which the flat, flexible cable further includes a crimped portion between a first loop of the double loops and a second loop of the double loop.

Example 13 includes the game controller of any of Examples 1-12, further comprising: a first linear rack coupled to the first handle and in sliding engagement with the bridge, the first linear rack extending substantially along the span of the bridge; and a pinion affixed to the bridge and in contact with the first linear rack, the pinion configured to rotate relative to the bridge as the first linear rack is translated relative to the pinion.

Example 14 includes the game controller of Example 13, further comprising a second linear rack coupled to the second handle and in sliding engagement with the bridge, the second linear rack extending substantially along the span of the bridge, the pinion being in contact with the second linear rack, the pinion further configured to rotate relative to the bridge as the second linear rack is translated relative to the pinion.

Example 15 includes the game controller of any of Examples 1-14, in which a guide portion of the first handle extends from the main body portion of the first handle and along a first end of the span of the bridge, the guide portion of the first handle configured to align the bridge with the main body portion of the first handle.

Example 16 includes the game controller of Example 15, in which a guide portion of the second handle extends from the main body portion of the second handle and along a second end of the span of the bridge, the guide portion of the second handle configured to align the bridge with the main body portion of the second handle.

Example 17 includes the game controller of any of Examples 1-16, in which the flat, flexible cable includes a double fold within the bridge.

Example 18 includes the game controller of Example 17, in which the double fold comprises a first fold being between a first elongated section of the flat, flexible cable and a folded section of the flat, flexible cable and a second fold being between a second elongated section of the flat, flexible cable and the folded section.

Example 19 includes the game controller of Example 18, in which a fold angle of the first fold and a fold angle of the second fold are substantially equal and are less than 180 degrees.

The previously described versions of the disclosed subject matter have many advantages that were either described or would be apparent to a person of ordinary skill. Even so, all of these advantages or features are not required in all versions of the disclosed apparatus, systems, or methods. For example, not all contemplated embodiments will include the second handle. As another example, not all contemplated embodiments having the second handle will include the second latch mechanism or the second spring mechanism. As another example, not all contemplated embodiments will include the connector of the game controller if, for example, the mobile device and the game controller communicate wirelessly.

Additionally, this written description makes reference to particular features. It is to be understood that the disclosure in this specification includes all possible combinations of those particular features. For example, where a particular feature is disclosed in the context of a particular aspect or embodiment, that feature can also be used, to the extent possible, in the context of other aspects and embodiments.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components.

Although specific embodiments have been illustrated and described for purposes of illustration, it will be understood that various modifications may be made without departing from the spirit and scope of the disclosure. Accordingly, the invention should not be limited except as by the appended claims.

We claim:

1. A game controller for a mobile device, the game controller comprising:
    a first handle configured to contact and support a mobile device, the first handle comprising a user-accessible, first hardware interface on a main body portion of the first handle and configured to accept touch inputs;
    a first electronic circuit within the first handle, the first electronic circuit coupled to the first hardware interface;
    a second handle configured to contact and support the mobile device, the second handle comprising a user-accessible, second hardware interface on a main body portion of the second handle and configured to accept touch inputs;
    a second electronic circuit within the second handle, the second electronic circuit coupled to the second hardware interface;
    a bridge coupling the first handle to the second handle, the bridge being in sliding engagement with the first handle and the second handle;
    a flat, flexible cable configured to conduct an electrical signal between the first handle and the second handle; and
    an electronic controller in the second handle, the electronic controller configured to receive an electrical signal from the second electronic circuit within the second handle and to receive an electrical signal from the first electronic circuit within the first handle via the flat, flexible cable.

2. The game controller of claim 1, in which a guide portion of the first handle extends from the main body portion of the first handle and along a first end of the span of the bridge, the guide portion of the first handle configured to align the bridge with the main body portion of the first handle.

3. The game controller of claim 2, in which a guide portion of the second handle extends from the main body portion of the second handle and along a second end of the span of the bridge, the guide portion of the second handle configured to align the bridge with the main body portion of the second handle.

4. The game controller of claim 1, in which the flat, flexible cable includes a double fold.

5. The game controller of claim 4, the bridge further comprising a tray configured to contain the flat, flexible cable within the tray, the double fold of the flat, flexible cable coinciding with a double jog in the tray.

6. The game controller of claim 1, in which the flat, flexible cable includes a double loop within at least one of the first handle and the second handle.

7. A game controller for a mobile device, the game controller comprising:
    a first handle configured to contact and support a mobile device, the first handle comprising a user-accessible, first hardware interface on a main body portion of the first handle and configured to accept touch inputs;
    a second handle configured to contact and support the mobile device, the second handle comprising a user-accessible, second hardware interface on a main body portion of the second handle and configured to accept touch inputs;
    a bridge coupling the first handle to the second handle, the bridge being in sliding engagement with the first handle and the second handle, the bridge further comprising a tray configured to contain the flat, flexible cable within the tray; and
    a flat, flexible cable configured to conduct an electrical signal between the first handle and the second handle, the flat, flexible cable including a double fold, the double fold coinciding with a double jog in the tray.

8. The game controller of claim 7, in which the flat, flexible cable includes a double loop within at least one of the first handle and the second handle.

9. A game controller for a mobile device, the game controller comprising:
    a first handle configured to contact and support a mobile device, the first handle comprising a user-accessible, first hardware interface on a main body portion of the first handle and configured to accept touch inputs;
    a second handle configured to contact and support the mobile device, the second handle comprising a user-accessible, second hardware interface on a main body portion of the second handle and configured to accept touch inputs;
    a bridge coupling the first handle to the second handle, the bridge being in sliding engagement with the first handle and the second handle, the bridge having a span extending away from the main body portion of the first handle, the span having a transverse midline, the midline of the bridge being between the first handle and the second handle, the bridge and the first handle being configured for the main body portion of the first handle to translate in a retraction direction toward the midline of the bridge and into a retracted configuration and also to translate in an extension direction away from the midline of the bridge into an extended configuration, the bridge and the second handle being configured for the main body portion of the second handle to translate along the bridge in the retraction direction toward the midline of the bridge and into the retracted configuration and also to translate in the extension direction away from the midline of the bridge and into the extended configuration; and a flat, flexible cable configured to conduct an electrical signal between the first handle and the second handle, the flat, flexible cable including a double fold at the midline of the bridge.

10. The game controller of claim 9, the bridge further comprising a tray configured to contain the flat, flexible cable within the tray, the double fold of the flat, flexible cable coinciding with a double jog in the tray.

11. The game controller of claim 9, in which the flat, flexible cable is fixed to the bridge at the midline of the bridge.

12. The game controller of claim 9, in which the flat, flexible cable includes a double loop within the first handle.

13. The game controller of claim 12, in which the flat, flexible cable further includes a crimped portion between a first loop of the double loops and a second loop of the double loop.

14. The game controller of claim 9, in which the flat, flexible cable includes a double loop within the second handle.

15. The game controller of claim 14, in which the flat, flexible cable further includes a crimped portion between a first loop of the double loops and a second loop of the double loop.

16. A game controller for a mobile device, the game controller comprising:
- a first handle configured to contact and support a mobile device, the first handle comprising a user-accessible, first hardware interface on a main body portion of the first handle and configured to accept touch inputs;
- a second handle configured to contact and support the mobile device, the second handle comprising a user-accessible, second hardware interface on a main body portion of the second handle and configured to accept touch inputs;
- a bridge coupling the first handle to the second handle, the bridge being in sliding engagement with the first handle and the second handle;
- a flat, flexible cable configured to conduct an electrical signal between the first handle and the second handle;
- a first linear rack coupled to the first handle and in sliding engagement with the bridge, the first linear rack extending substantially along the span of the bridge; and
- a pinion affixed to the bridge and in contact with the first linear rack, the pinion configured to rotate relative to the bridge as the first linear rack is translated relative to the pinion.

17. The game controller of claim 16, further comprising a second linear rack coupled to the second handle and in sliding engagement with the bridge, the second linear rack extending substantially along the span of the bridge, the pinion being in contact with the second linear rack, the pinion further configured to rotate relative to the bridge as the second linear rack is translated relative to the pinion.

18. The game controller of claim 17, in which the flat, flexible cable includes a double fold.

19. The game controller of claim 18, the bridge further comprising a tray configured to contain the flat, flexible cable within the tray, the double fold of the flat, flexible cable coinciding with a double jog in the tray.

20. The game controller of claim 17, in which the flat, flexible cable includes a double loop within at least one of the first handle and the second handle.

21. A game controller for a mobile device, the game controller comprising:
- a first handle configured to contact and support a mobile device, the first handle comprising a user-accessible, first hardware interface on a main body portion of the first handle and configured to accept touch inputs;
- a second handle configured to contact and support the mobile device, the second handle comprising a user-accessible, second hardware interface on a main body portion of the second handle and configured to accept touch inputs;
- a bridge coupling the first handle to the second handle, the bridge being in sliding engagement with the first handle and the second handle; and
- a flat, flexible cable configured to conduct an electrical signal between the first handle and the second handle, the flat, flexible cable including a double fold within the bridge.

22. The game controller of claim 21, in which the double fold comprises a first fold being between a first elongated section of the flat, flexible cable and a folded section of the flat, flexible cable and a second fold being between a second elongated section of the flat, flexible cable and the folded section.

23. The game controller of claim 22, in which a fold angle of the first fold and a fold angle of the second fold are substantially equal and are less than 180 degrees.

24. The game controller of claim 21, the bridge further comprising a tray configured to contain the flat, flexible cable within the tray, the double fold of the flat, flexible cable coinciding with a double jog in the tray.

25. The game controller of claim 21, in which the flat, flexible cable includes a double loop within at least one of the first handle and the second handle.

* * * * *